United States Patent
Park et al.

(10) Patent No.: US 10,356,784 B2
(45) Date of Patent: Jul. 16, 2019

(54) METHOD AND APPARATUS FOR CONSTRUCTING CONTROL FIELD INCLUDING INFORMATION REGARDING RESOURCE UNIT IN WIRELESS LOCAL AREA NETWORK SYSTEM

(71) Applicant: LG ELECTRONICS INC., Seoul (KR)

(72) Inventors: Eunsung Park, Seoul (KR); Dongguk Lim, Seoul (KR); Hangyu Cho, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 45 days.

(21) Appl. No.: 15/619,342

(22) Filed: Jun. 9, 2017

(65) Prior Publication Data

US 2017/0359812 A1    Dec. 14, 2017

Related U.S. Application Data

(60) Provisional application No. 62/349,665, filed on Jun. 14, 2016.

(51) Int. Cl.
*H04W 72/04*     (2009.01)
*H04W 84/12*     (2009.01)

(52) U.S. Cl.
CPC ........ *H04W 72/0453* (2013.01); *H04W 84/12* (2013.01)

(58) Field of Classification Search
CPC .............. H04B 7/0452; H04L 27/2601; H04L 27/2666; H04L 5/0007; H04L 5/001; H04L 5/0023; H04L 5/0041; H04L 5/0053; H04L 5/0092; H04W 24/08; H04W 72/0453; H04W 84/12; H04W 88/08

See application file for complete search history.

(56) References Cited

U.S. PATENT DOCUMENTS

| | | | | |
|---|---|---|---|---|
| 8,605,568 B2 * | 12/2013 | Batra | ............... | H04L 27/18 370/203 |
| 8,654,881 B2 * | 2/2014 | Oh | ............... | H04L 1/0083 375/267 |
| 9,154,350 B2 * | 10/2015 | Batra | ............... | H04L 27/18 |
| 9,532,187 B2 * | 12/2016 | Seok | ............... | H04L 69/324 |
| 9,537,702 B2 * | 1/2017 | Chavali | ............... | H04L 27/2672 |
| 9,544,914 B2 * | 1/2017 | Azizi | ............... | H04W 72/1278 |
| 9,591,493 B2 * | 3/2017 | Gutierrez | ............... | H04W 84/12 |
| 9,628,310 B2 * | 4/2017 | Lee | ............... | H04L 27/26 |

(Continued)

*Primary Examiner* — Eric Nowlin
(74) *Attorney, Agent, or Firm* — Lee Hong Degerman Kang Waimey

(57) ABSTRACT

Proposed is a control field including allocation information regarding a resource unit (RU) in a wireless local area network (WLAN) system supporting a plurality of RUs. The control field including the allocation information regarding the RU may be included in an uplink or downlink a physical layer (PHY) protocol data unit (PPDU), and may be designed in consideration of a plurality of frequency bands. A control field corresponding to a specific frequency band may be duplicated in a different frequency band. Further, the control field corresponding to the specific frequency band may be used for scheduling of a data field corresponding to the same frequency band and a data field corresponding to the different frequency band.

9 Claims, 23 Drawing Sheets

(56) References Cited

U.S. PATENT DOCUMENTS

| | | | |
|---|---|---|---|
| 9,634,746 B2* | 4/2017 | Park | H04B 7/0452 |
| 9,673,943 B2* | 6/2017 | Seok | H04L 5/0007 |
| 9,742,544 B2* | 8/2017 | Seok | H04L 5/0055 |
| 9,749,971 B2* | 8/2017 | Seok | H04W 52/146 |
| 9,775,147 B2* | 9/2017 | Kenney | H04B 7/0452 |
| 9,775,174 B2* | 9/2017 | Seok | H04W 74/0808 |
| 9,819,460 B2* | 11/2017 | Seok | H04B 7/0452 |
| 9,820,304 B2* | 11/2017 | Gong | H04W 74/0816 |
| 9,826,434 B2* | 11/2017 | Chu | H04W 28/20 |
| 9,832,058 B2* | 11/2017 | Lee | H04L 1/0072 |
| 9,854,606 B2* | 12/2017 | Seok | H04W 74/04 |
| 9,866,359 B2* | 1/2018 | Seok | H04L 5/0055 |
| 9,867,210 B2* | 1/2018 | Azizi | H04W 72/1278 |
| 9,871,644 B2* | 1/2018 | Stacey | H04L 5/0091 |
| 9,900,067 B2* | 2/2018 | Oh | H04L 1/0083 |
| 9,900,878 B2* | 2/2018 | Seok | H04W 72/042 |
| 9,913,168 B2* | 3/2018 | Noh | H04L 5/0023 |
| 9,917,679 B2* | 3/2018 | Seok | H04L 5/0055 |
| 9,917,933 B2* | 3/2018 | Seok | H04L 69/323 |
| 9,936,488 B2* | 4/2018 | Seok | H04W 72/0413 |
| 9,949,290 B2* | 4/2018 | Seok | H04B 7/0452 |
| 9,973,353 B2* | 5/2018 | Park | H04L 25/03 |
| 9,985,739 B2* | 5/2018 | Seok | H04L 1/0003 |
| 10,009,840 B2* | 6/2018 | Chen | H04W 52/0206 |
| 10,014,992 B2* | 7/2018 | Sun | H04L 27/2613 |
| 10,021,722 B2* | 7/2018 | Chun | H04W 84/12 |
| 10,050,751 B2* | 8/2018 | Choi | H04L 5/0025 |
| 10,057,806 B2* | 8/2018 | Hedayat | H04W 28/0268 |
| 10,057,899 B2* | 8/2018 | Lee | H04L 1/00 |
| 10,075,269 B2* | 9/2018 | Chun | H04L 27/26 |
| 10,082,557 B1* | 9/2018 | Chu | G01S 5/0289 |
| 10,085,262 B2* | 9/2018 | Choi | H04W 72/08 |
| 10,200,514 B2* | 2/2019 | Chen | H04L 69/324 |
| 2010/0261429 A1* | 10/2010 | Batra | H04L 27/18 455/41.2 |
| 2012/0177017 A1* | 7/2012 | Gong | H04W 74/0816 370/338 |
| 2012/0230448 A1* | 9/2012 | Kang | H03M 13/6527 375/295 |
| 2014/0153558 A1* | 6/2014 | Batra | H04L 27/18 370/338 |
| 2014/0211775 A1* | 7/2014 | Sampath | H04W 28/06 370/338 |
| 2014/0286455 A1* | 9/2014 | Choi | H04L 5/0048 375/308 |
| 2015/0049716 A1* | 2/2015 | Gutierrez | H04W 84/12 370/329 |
| 2015/0117429 A1* | 4/2015 | Lee | H04L 1/007 370/338 |
| 2016/0007325 A1* | 1/2016 | Seok | H04B 7/0452 370/329 |
| 2016/0007342 A1* | 1/2016 | Seok | H04B 7/0452 370/338 |
| 2016/0014813 A1* | 1/2016 | Seok | H04W 74/0808 370/336 |
| 2016/0029373 A1* | 1/2016 | Seok | H04L 5/0055 370/338 |
| 2016/0043855 A1* | 2/2016 | Seok | H04L 5/0055 370/330 |
| 2016/0044533 A1* | 2/2016 | Seok | H04L 5/0007 370/330 |
| 2016/0044635 A1* | 2/2016 | Seok | H04L 69/324 370/312 |
| 2016/0050634 A1* | 2/2016 | Seok | H04W 52/146 370/338 |
| 2016/0050659 A1* | 2/2016 | Seok | H04L 1/0003 370/338 |
| 2016/0056930 A1* | 2/2016 | Seok | H04L 5/0026 370/330 |
| 2016/0057657 A1* | 2/2016 | Seok | H04L 69/324 370/476 |
| 2016/0088602 A1* | 3/2016 | Seok | H04L 5/0055 370/338 |
| 2016/0100396 A1* | 4/2016 | Seok | H04L 5/003 370/329 |
| 2016/0105836 A1* | 4/2016 | Seok | H04W 72/042 370/331 |
| 2016/0113009 A1* | 4/2016 | Seok | H04B 7/0452 370/329 |
| 2016/0113034 A1* | 4/2016 | Seok | H04W 74/04 370/329 |
| 2016/0119174 A1* | 4/2016 | Chavali | H04L 27/2672 370/252 |
| 2016/0128057 A1* | 5/2016 | Seok | H04L 5/0055 370/329 |
| 2016/0135224 A1* | 5/2016 | Lee | H04L 27/2607 370/338 |
| 2016/0143010 A1* | 5/2016 | Kenney | H04B 7/0452 370/330 |
| 2016/0143026 A1* | 5/2016 | Seok | H04W 72/0413 370/329 |
| 2016/0156438 A1* | 6/2016 | Sun | H04L 27/2602 370/330 |
| 2016/0174200 A1* | 6/2016 | Seok | H04W 72/04 370/329 |
| 2016/0212246 A1* | 7/2016 | Seok | H04L 69/323 |
| 2016/0242177 A1* | 8/2016 | Seok | H04W 72/0446 |
| 2016/0248569 A1* | 8/2016 | Ghosh | H04L 1/1614 |
| 2016/0249397 A1* | 8/2016 | Seok | H04W 76/14 |
| 2016/0286551 A1* | 9/2016 | Lee | H04L 27/26 |
| 2016/0315675 A1* | 10/2016 | Seok | H04B 7/0452 |
| 2016/0323426 A1* | 11/2016 | Hedayat | H04W 28/0268 |
| 2016/0330300 A1* | 11/2016 | Josiam | H04L 69/22 |
| 2016/0374085 A1* | 12/2016 | Chun | H04W 52/146 |
| 2017/0019916 A1* | 1/2017 | Azizi | H04W 72/1278 |
| 2017/0048862 A1* | 2/2017 | Choi | H04L 5/0053 |
| 2017/0070914 A1* | 3/2017 | Chun | H04W 4/70 |
| 2017/0070998 A1* | 3/2017 | Wu | H04L 5/0023 |
| 2017/0078052 A1* | 3/2017 | Matsuo | H04L 1/1867 |
| 2017/0079071 A1* | 3/2017 | Zhou | H04W 74/0833 |
| 2017/0093546 A1* | 3/2017 | Wu | H04L 5/0037 |
| 2017/0118676 A1* | 4/2017 | Li | H04W 28/06 |
| 2017/0126456 A1* | 5/2017 | Lee | H04L 1/0072 |
| 2017/0149523 A1* | 5/2017 | Li | H04B 7/0452 |
| 2017/0149547 A1* | 5/2017 | Kim | H04B 7/26 |
| 2017/0163394 A1* | 6/2017 | Choi | H04L 5/0048 |
| 2017/0171878 A1* | 6/2017 | Chun | H04L 5/00 |
| 2017/0237532 A1* | 8/2017 | Li | H04L 5/0007 370/338 |
| 2017/0244530 A1* | 8/2017 | Cariou | H04L 5/003 |
| 2017/0257231 A1* | 9/2017 | Park | H04L 25/03 |
| 2017/0265129 A1* | 9/2017 | Chen | H04W 52/0206 |
| 2017/0272146 A1* | 9/2017 | Matsuo | H04W 76/14 |
| 2017/0280452 A1* | 9/2017 | Choi | H04W 72/0453 |
| 2017/0288748 A1* | 10/2017 | Lou | H04B 7/0452 |
| 2017/0303201 A1* | 10/2017 | Park | H04L 25/03 |
| 2017/0310506 A1* | 10/2017 | Park | H04L 25/03 |
| 2017/0324525 A1* | 11/2017 | Choi | H04L 5/0039 |
| 2017/0359158 A1* | 12/2017 | Lim | H04L 5/0046 |
| 2017/0359812 A1* | 12/2017 | Park | H04W 72/0453 |
| 2017/0373806 A1* | 12/2017 | Choi | H04L 1/00 |
| 2017/0373816 A1* | 12/2017 | Son | H04L 5/001 |
| 2017/0373901 A1* | 12/2017 | Lim | H04L 27/2613 |
| 2018/0013527 A1* | 1/2018 | Sun | H04L 27/2613 |
| 2018/0014302 A1* | 1/2018 | Asterjadhi | H04W 72/0446 |
| 2018/0014329 A1* | 1/2018 | Lee | H04W 74/0816 |
| 2018/0027514 A1* | 1/2018 | Chen | H04L 27/2601 370/338 |
| 2018/0049198 A1* | 2/2018 | Viger | H04W 74/0816 |
| 2018/0049242 A1* | 2/2018 | Viger | H04W 72/0446 |
| 2018/0092107 A1* | 3/2018 | Cariou | H04W 52/0225 |
| 2018/0131553 A1* | 5/2018 | Choi | H04L 5/02 |
| 2018/0145811 A1* | 5/2018 | Park | H04L 69/323 |
| 2018/0146478 A1* | 5/2018 | Kim | H04W 72/04 |
| 2018/0167879 A1* | 6/2018 | Kim | H04W 52/02 |
| 2018/0176066 A1* | 6/2018 | Lim | H04L 1/00 |
| 2018/0198591 A1* | 7/2018 | Stacey | H04L 5/0091 |
| 2018/0205584 A1* | 7/2018 | Lim | H04L 5/00 |
| 2018/0212725 A1* | 7/2018 | Park | H04L 27/26 |
| 2018/0212738 A1* | 7/2018 | Chun | H04L 1/16 |
| 2018/0227952 A1* | 8/2018 | Kim | H04W 74/00 |

(56) References Cited

U.S. PATENT DOCUMENTS

| | | | |
|---|---|---|---|
| 2018/0242293 A1* | 8/2018 | Li | H04B 7/0413 |
| 2018/0254871 A1* | 9/2018 | Choi | H04L 5/00 |
| 2018/0279171 A1* | 9/2018 | Matsuo | H04W 28/06 |
| 2018/0288754 A1* | 10/2018 | Choi | H04W 72/0406 |
| 2018/0309550 A1* | 10/2018 | Sun | H04L 27/2613 |
| 2018/0317128 A1* | 11/2018 | Chun | H04B 7/26 |
| 2018/0323919 A1* | 11/2018 | Sun | H04L 5/0007 |
| 2018/0323921 A1* | 11/2018 | Choi | H04L 5/0025 |
| 2018/0359758 A1* | 12/2018 | Choi | H04W 72/08 |
| 2018/0359761 A1* | 12/2018 | Chun | H04L 5/00 |
| 2019/0007130 A1* | 1/2019 | Fang | H04B 7/2656 |
| 2019/0044778 A1* | 2/2019 | Park | H04L 27/2626 |
| 2019/0045461 A1* | 2/2019 | Fang | H04W 52/367 |
| 2019/0053240 A1* | 2/2019 | Park | H04B 7/0413 |

* cited by examiner

PPDU Format (IEEE 802.11a/g)

HT PPDU Format (IEEE 802.11n)

VHT PPDU Format (IEEE 802.11ac)

METHOD AND APPARATUS FOR CONSTRUCTING CONTROL FIELD INCLUDING INFORMATION REGARDING RESOURCE UNIT IN WIRELESS LOCAL AREA NETWORK SYSTEM

CROSS-REFERENCE TO RELATED APPLICATIONS

Pursuant to 35 U.S.C. § 119(e), this application claims the benefit of U.S. Provisional Patent Application No. 62/349,665, filed on Jun. 14, 2016, the contents of which are hereby incorporated by reference herein in its entirety.

BACKGROUND OF THE INVENTION

Field of the Invention

The present specification relates to a technique for transmitting/receiving data in wireless communication, and more particularly, to a method and apparatus for constructing a control field including information regarding a resource unit in a wireless local area network (WLAN) system.

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY OF THE INVENTION

The present specification proposes a control field including information regarding a resource unit (RU) in a wireless local area network (WLAN) system.

The present specification proposes a control field constructed on the basis of multiple channels or frequency bands.

An example of the present specification may be applied to a WLAN system using at least one RU corresponding to a preset frequency band.

An example of the present specification may be applied to a transmission device. For example, the transmission device may correspond to an access point (AP) station (STA), and a reception device may correspond to a non-AP STA. In the present embodiment, the transmission device may transmit a PPDU through a wider band, such as a 40 MHz, 80 MHz, or 80+80/160 MHz band, while the reception device may have a capability only for a narrow band, such as a 20 MHz band. In the present embodiment, it is assumed that the transmission device transmits a PPDU through an 80 MH band, and the reception device has a capability for a 20 MHz band only.

The transmission device configures a physical protocol data unit (PPDU) including first to fourth data fields corresponding to first to fourth frequency bands. According to an example of FIG. 22, the first to fourth frequency bands may each correspond to a 20 MHz band.

The transmission device transmits the PPDU to the reception device.

Specifically, the PPDU further includes a first control field and a second control field. The first control field may correspond to an HE-SIG-A field, and the second control field may correspond to an HE-SIG-B field.

The first control field includes an indicator for determining a frequency band used by the reception device when the reception device has only the capability for the 20 MHz band. The indicator indicates the first frequency band or the second frequency band. Here, the first frequency band may correspond to primary 20 MHz, and the second frequency band may correspond to secondary 20 MHz.

The reception device having only the capability for the 20 MHz band may decode the PPDU only for a narrow band in order to save power. If the reception device having only the capability for the 20 MHz band always uses the primary 20 MHz band, additional signaling for channel indication is not required but bandwidth efficiency is poor. Thus, in order to increase bandwidth efficiency, it may be indicated through the indicator in the first control field indicate whether a center frequency used by the reception device is primary 20 MHz or secondary 20 MHz.

Here, the indicator may be set to one bit. Thus, signaling overhead may be reduced as compared with the case where a frequency band used by the reception device is indicated one by one.

When the indicator indicates the first frequency band, the frequency band used by the reception device may be determined to be the first frequency band or the third frequency band according to the second control field. In addition, when the indicator indicates the second frequency band, the frequency band used by the reception device may be determined to be the second frequency band or the fourth frequency band according to the second control field.

This is because the second control field and the frequency band have the following mapping relationship.

The second control field includes a first signal field corresponding to the first frequency band and a second signal field corresponding to the second frequency band.

The first signal field includes identification information on at least one reception device allocated to the first data field and the third data field, and further includes allocation information on at least one RU for the first data field and the third data field.

The second signal field includes identification information on at least one reception device allocated to the second data field and the fourth data field, and further includes allocation information on at least one RU for the second data field and the fourth data field.

The second control field includes a third signal field which is a duplicate of the first signal field, and the third signal field corresponds to the third frequency band.

The second control field includes a fourth signal field which is a duplicate of the second signal field, and the fourth signal field corresponds to the fourth frequency band.

Accordingly, the reception device having only the capability for the 20 MHz band may use primary 20 MHz or a frequency band (or channel) corresponding to primary 20 MHz or may use secondary 20 MHz or a frequency band (or channel) corresponding to secondary 20 MHz through the first control field and the second control field.

The identification information on the at least one reception device may include an association identifier (AID) of an STA.

In addition, the first signal field may include a user-common field and a user-specific field. The user-common field may include allocation information on at least one RU for the first data field and the third data field. The user-specific field may include identification information on at least one STA allocated to the first data field and the third data field.

Also, the second signal field may include a user-common field and a user-specific field. The user-common field may include allocation information on at least one RU for the second data field and the fourth data field. The user-specific field may include identification information on at least one STA allocated to the second data field and the fourth data field.

According to a technique in accordance with an example of the present specification, a control field is configured based on a plurality of channels or frequency bands, thereby efficiently transmitting data between an STA having a capability for a 20 MHz band only and an AP using a wider band.

DESCRIPTION OF EXEMPLARY EMBODIMENTS

Figure 1:
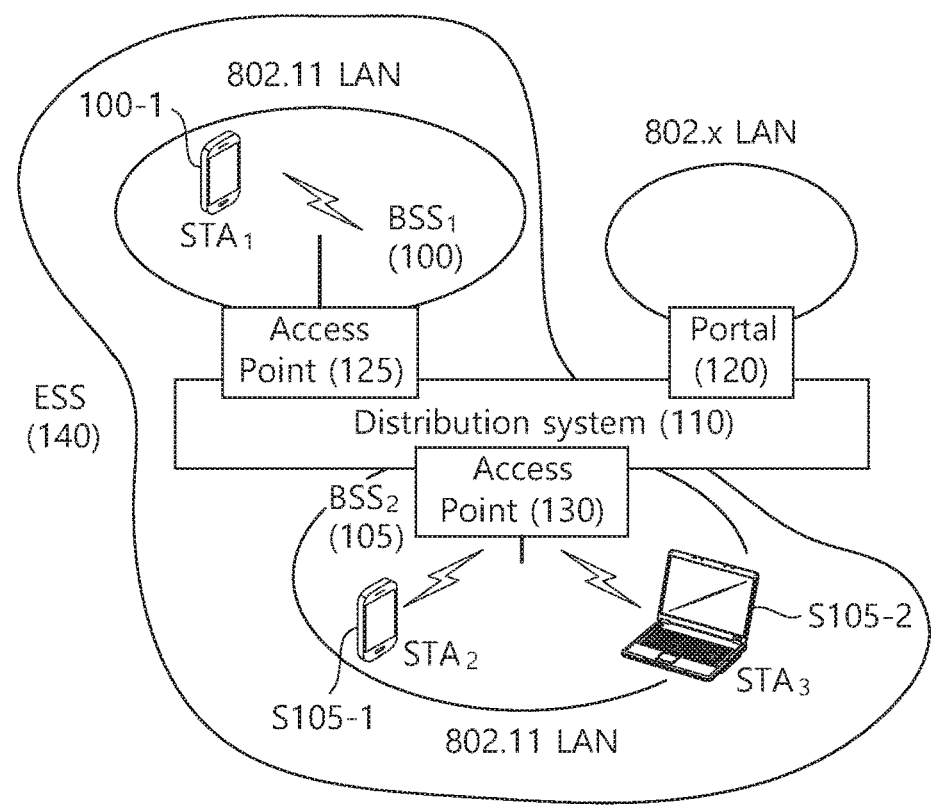
FIG. 1 is a conceptual view illustrating the structure of a wireless local area network (WLAN).
Figure 1:
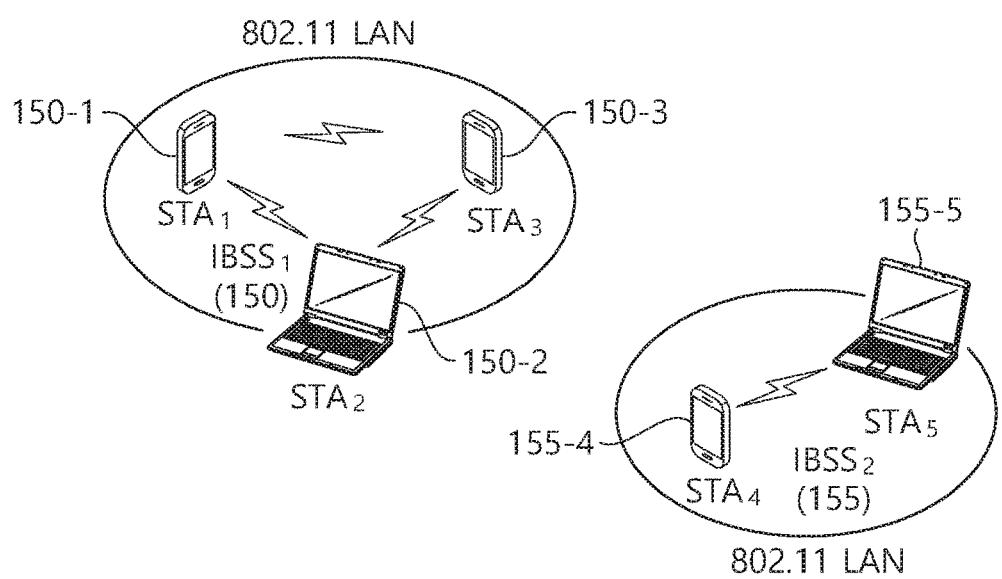

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region. The BSS 105 may include one or more STAs 105-1 and 105-2 which may be joined to one AP 130.

The BSS may include at least one STA, APs providing a distribution service, and a distribution system (DS) 110 connecting multiple APs.

The distribution system 110 may implement an extended service set (ESS) 140 extended by connecting the multiple BSSs 100 and 105. The ESS 140 may be used as a term indicating one network configured by connecting one or more APs 125 or 230 through the distribution system 110. The AP included in one ESS 140 may have the same service set identification (SSID).

A portal 120 may serve as a bridge which connects the wireless LAN network (IEEE 802.11) and another network (e.g., 802.X).

In the BSS illustrated in the upper part of FIG. 1, a network between the APs 125 and 130 and a network between the APs 125 and 130 and the STAs 100-1, 105-1, and 105-2 may be implemented. However, the network is configured even between the STAs without the APs 125 and 130 to perform communication. A network in which the communication is performed by configuring the network even between the STAs without the APs 125 and 130 is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs 150-1, 150-2, 150-3, 155-4, and 155-5 are managed by a distributed manner. In the IBSS, all STAs 150-1, 150-2, 150-3, 155-4, and 155-5 may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Figure 2:
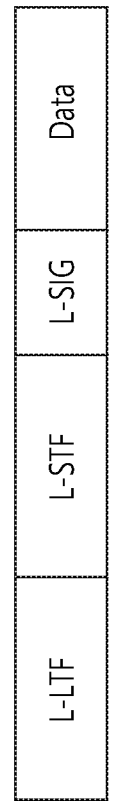
FIG. 2 is a diagram illustrating an example of a physical layer (PHY) protocol data unit (PPDU) used in an institute of electronic and electronics engineers (IEEE) standard.
Figure 2:
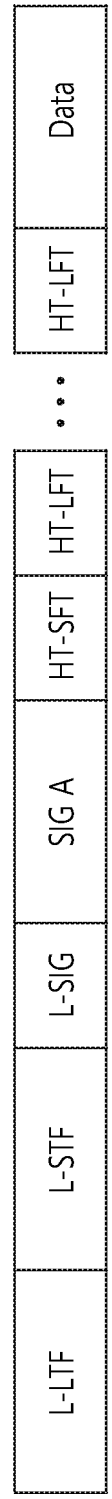
Figure 2:

FIG. 2 is a diagram illustrating an example of a PPDU used in an IEEE standard.

As illustrated in FIG. 2, various types of PHY protocol data units (PPDUs) may be used in a standard such as IEEE a/g/n/ac, etc. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
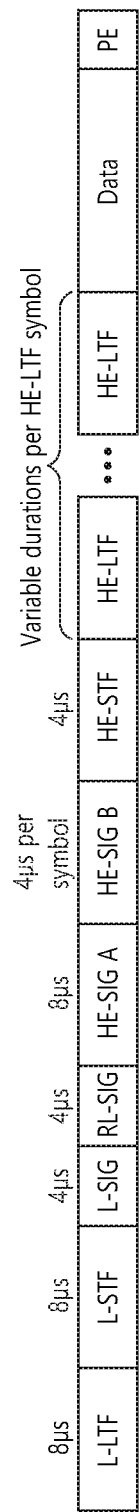
FIG. 3 is a diagram illustrating an example of a high efficiency (HE) PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 μs).

More detailed description of the respective fields of FIG. 3 will be made below.

Figure 4:
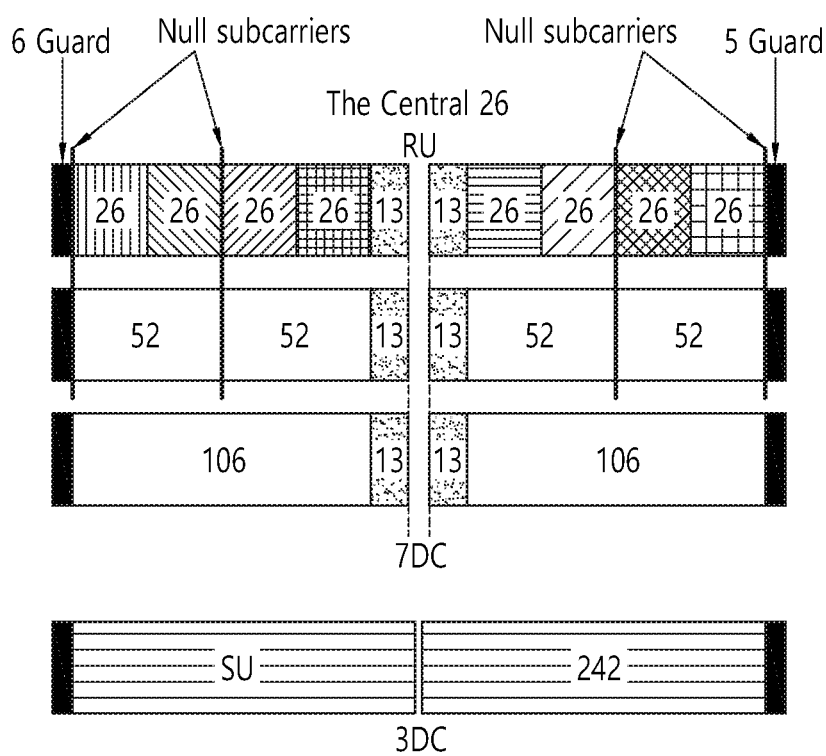
FIG. 4 is a diagram illustrating a layout of resource units (RUs) used in a band of 20 MHz.

FIG. 4 is a diagram illustrating a layout of resource units (RUs) used in a band of 20 MHz.

As illustrated in FIG. 4, resource units (RUs) corresponding to tone (that is, subcarriers) of different numbers are used to constitute some fields of the HE-PPDU. For example, the resources may be allocated by the unit of the RU illustrated with respect to the HE-STF, the HE-LTF, and the data field.

As illustrated in an uppermost part of FIG. 4, 26 units (that is, units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user. Meanwhile, the RU layout of FIG. 4 may be used even in a situation for a single user (SU) in addition to the multiple users (MUs) and in this case, as illustrated in a lowermost part of FIG. 4, one 242-unit may be used and in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
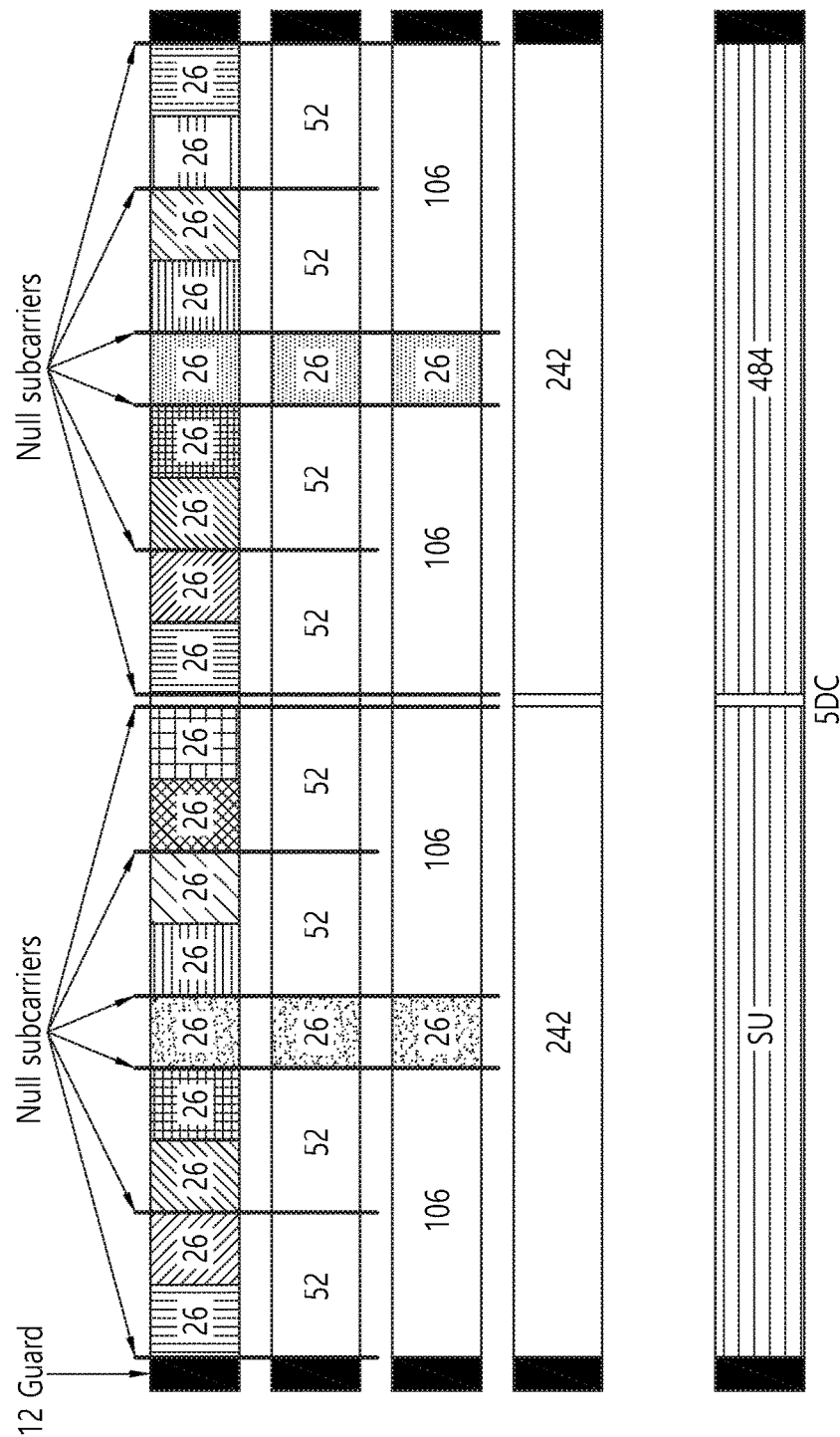
FIG. 5 is a diagram illustrating a layout of RUs used in a band of 40 MHz.

FIG. 5 is a diagram illustrating a layout of resource units (RUs) used in a band of 40 MHz.

Similarly to a case in which the RUs having various RUs are used in one example of FIG. 4, 26-RU, 52-RU, 106-RU, 242-RU, 484-RU, and the like may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
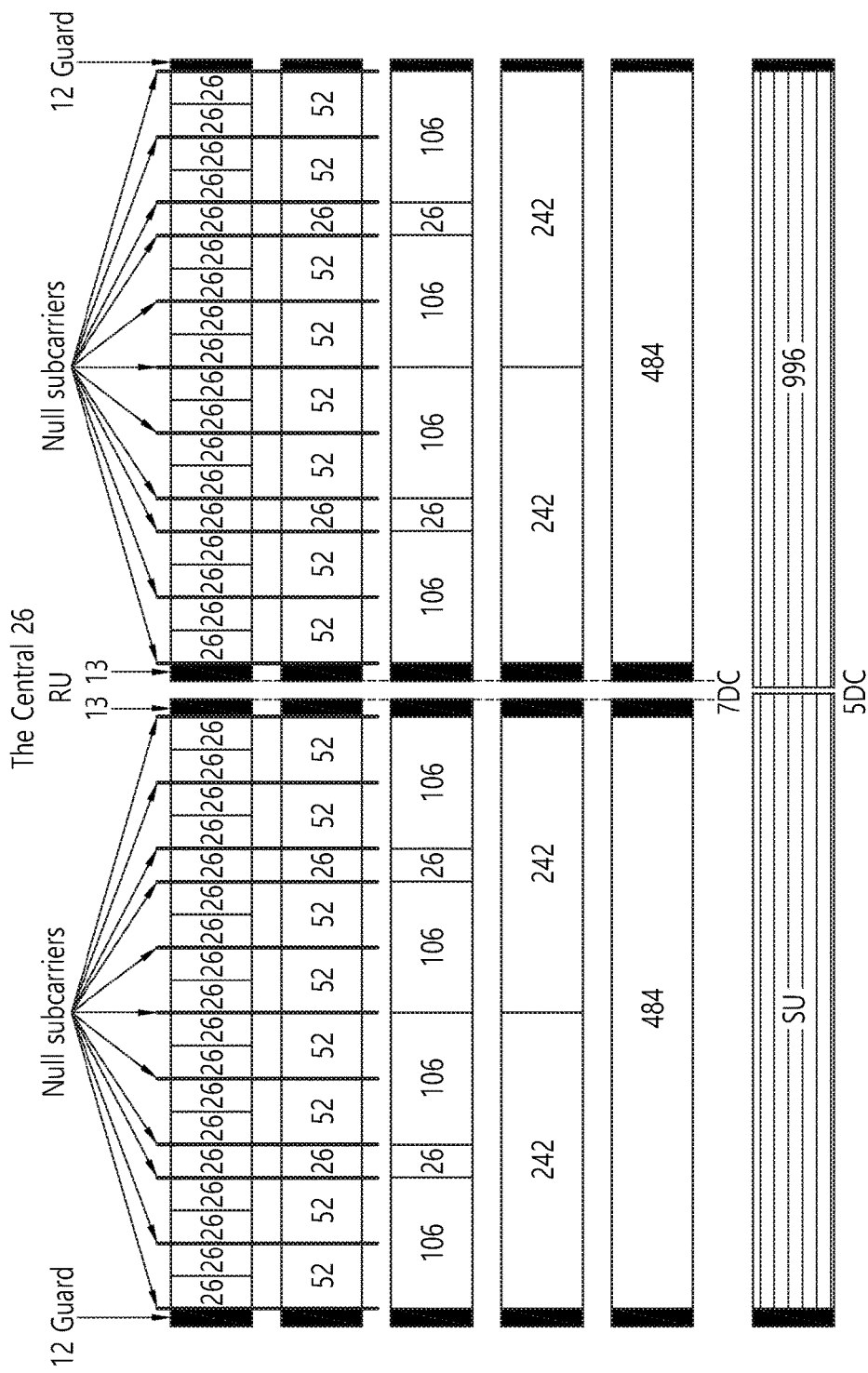
FIG. 6 is a diagram illustrating a layout of RUs used in a band of 80 MHz.

FIG. 6 is a diagram illustrating a layout of resource units (RUs) used in a band of 80 MHz.

Similarly to a case in which the RUs having various RUs are used in one example of each of FIG. 4 or 5, 26-RU, 52-RU, 106-RU, 242-RU, 484-RU, and the like may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 6, when the RU layout is used for the single user, 996-RU may be used and in this case, 5 DC tones may be inserted. Meanwhile, the detailed number of RUs may be modified similarly to one example of each of FIG. 4 or 5.

Meanwhile, the detailed number of RUs may be modified similarly to one example of each of FIG. 4 or 5.

Figure 7:
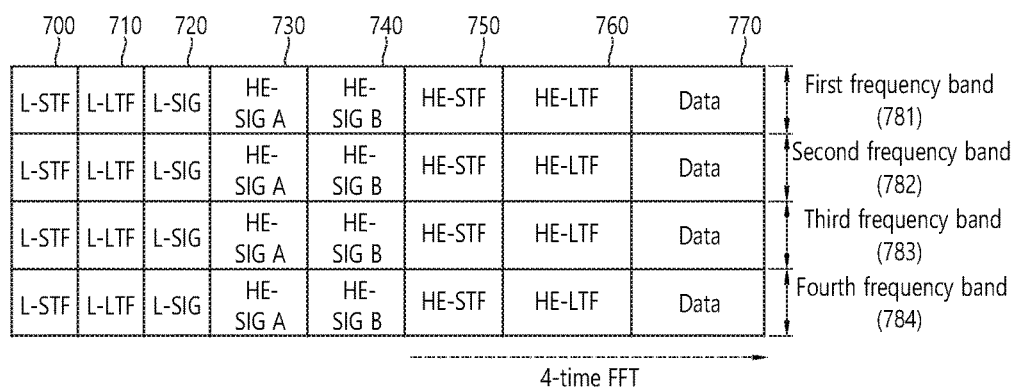
FIG. 7 is a diagram illustrating another example of the HE PPDU.

FIG. 7 is a diagram illustrating another example of the HE PPDU.

A block illustrated in FIG. 7 is another example of describing the HE-PPDU block of FIG. 3 in terms of a frequency.

An illustrated L-STF 700 may include a short training orthogonal frequency division multiplexing (OFDM) symbol. The L-STF 700 may be used for frame detection, automatic gain control (AGC), diversity detection, and coarse frequency/time synchronization.

An L-LTF 710 may include a long training orthogonal frequency division multiplexing (01-DM) symbol. The L-LTF 710 may be used for fine frequency/time synchronization and channel prediction.

An L-SIG 720 may be used for transmitting control information. The L-SIG 720 may include information regarding a data rate and a data length. Further, the L-SIG 720 may be repeatedly transmitted. That is, a new format, in which the L-SIG 720 is repeated (for example, may be referred to as R-LSIG) may be configured.

An HE-SIG-A 730 may include the control information common to the receiving station.

In detail, the HE-SIG-A 730 may include information on 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to the HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), 13) a field indicating information on a CRC field of the HE-SIG-A, and the like. A detailed field of the HE-SIG-A may be added or partially omitted. Further, some fields of the HE-SIG-A may be partially added or omitted in other environments other than a multi-user (MU) environment.

An HE-SIG-B 740 may be included only in the case of the PPDU for the multiple users (MUs) as described above. Principally, an HE-SIG-A 750 or an HE-SIG-B 760 may include resource allocation information (alternatively, virtual resource allocation information) for at least one receiving STA.

Figure 8:
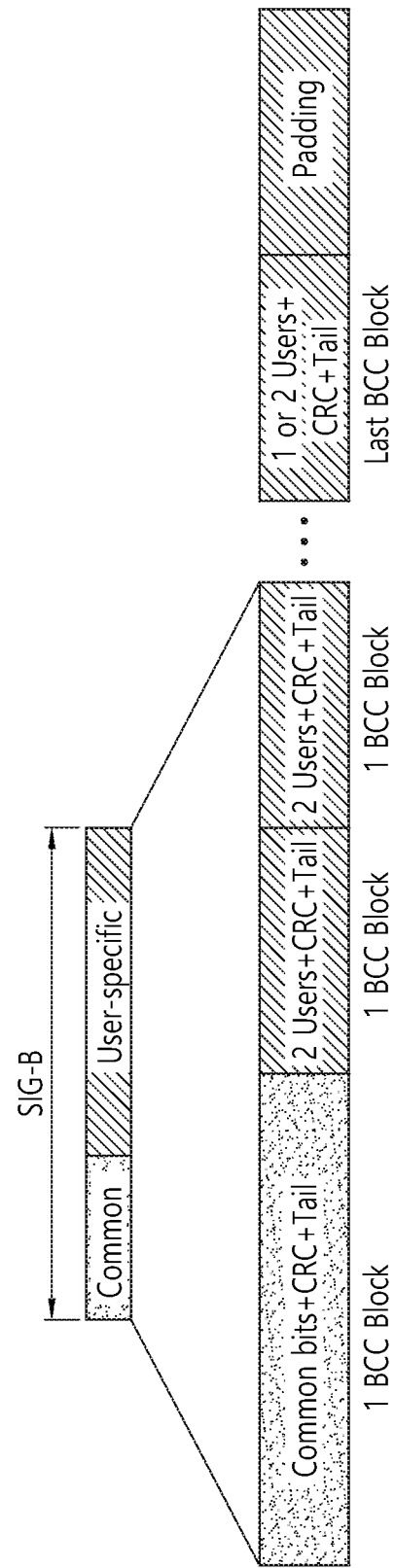
FIG. 8 is a block diagram illustrating one example of high efficiency signal B (HE-SIG-B) according to an embodiment.

FIG. 8 is a block diagram illustrating one example of HE-SIG-B according to an embodiment.

As illustrated in FIG. 8, the HE-SIG-B field includes a common field at a frontmost part and the corresponding common field is separated from a field which follows therebehind to be encoded. That is, as illustrated in FIG. 8, the HE-SIG-B field may include a common field including the common control information and a user-specific field including user-specific control information. In this case, the common field may include a CRC field corresponding to the common field, and the like and may be coded to be one BCC block. The user-specific field subsequent thereafter may be coded to be one BCC block including the "user-specific field" for 2 users and a CRC field corresponding thereto as illustrated in FIG. 8.

A previous field of the HE-SIG-B 740 may be transmitted in a duplicated form on an MU PPDU. In the case of the HE-SIG-B 740, the HE-SIG-B 740 transmitted in some frequency band (e.g., a fourth frequency band) may even include control information for a data field corresponding to a corresponding frequency band (that is, the fourth frequency band) and a data field of another frequency band (e.g., a second frequency band) other than the corresponding frequency band. Further, a format may be provided, in which the HE-SIG-B 740 in a specific frequency band (e.g., the second frequency band) is duplicated with the HE-SIG-B 740 of another frequency band (e.g., the fourth frequency band). Alternatively, the HE-SIG B 740 may be transmitted in an encoded form on all transmission resources. A field after the HE-SIG B 740 may include individual information for respective receiving STAs receiving the PPDU.

The HE-STF 750 may be used for improving automatic gain control estimation in a multiple input multiple output (MIMO) environment or an OFDMA environment.

The HE-LTF 760 may be used for estimating a channel in the MIMO environment or the OFDMA environment.

The size of fast Fourier transform (FFT)/inverse fast Fourier transform (IFFT) applied to the HE-STF 750 and the field after the HE-STF 750, and the size of the FFT/IFFT applied to the field before the HE-STF 750 may be different from each other. For example, the size of the FFT/IFFT applied to the HE-STF 750 and the field after the HE-STF 750 may be four times larger than the size of the FFT/IFFT applied to the field before the HE-STF 750.

For example, when at least one field of the L-STF 700, the L-LTF 710, the L-SIG 720, the HE-SIG-A 730, and the HE-SIG-B 740 on the PPDU of FIG. 7 is referred to as a first field, at least one of the data field 770, the HE-STF 750, and the HE-LTF 760 may be referred to as a second field. The first field may include a field associated with a legacy system and the second field may include a field associated with an HE system. In this case, the fast Fourier transform (FFT) size and the inverse fast Fourier transform (IFFT) size may be defined as a size which is N (N is a natural number, e.g., N=1, 2, and 4) times larger than the FFT/IFFT size used in the legacy wireless LAN system. That is, the FFT/IFFT having the size may be applied, which is N (=4) times larger than the first field of the HE PPDU. For example, 256 FFT/IFFT may be applied to a bandwidth of 20 MHz, 512 FFT/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous 160 MHz.

In other words, a subcarrier space/subcarrier spacing may have a size which is 1/N times (N is the natural number, e.g., N=4, the subcarrier spacing is set to 78.125 kHz) the subcarrier space used in the legacy wireless LAN system. That is, subcarrier spacing having a size of 312.5 kHz, which is legacy subcarrier spacing may be applied to the first field of the HE PPDU and a subcarrier space having a size of 78.125 kHz may be applied to the second field of the HE PPDU. Alternatively, an IDFT/DFT period applied to each symbol of the first field may be expressed to be N (=4) times shorter than the IDFT/DFT period applied to each data symbol of the second field. That is, the IDFT/DFT length applied to each symbol of the first field of the HE PPDU may be expressed as 3.2 µs and the IDFT/DFT length applied to each symbol of the second field of the HE PPDU may be expressed as 3.2 µs*4 (=12.8 µs). The length of the OFDM symbol may be a value acquired by adding the length of a guard interval (GI) to the IDFT/DFT length. The length of the GI may have various values such as 0.4 μs, 0.8 μs, 1.6 μs, 2.4 μs, and 3.2 μs.

For simplicity in the description, in FIG. 7, it is expressed that a frequency band used by the first field and a frequency band used by the second field accurately coincide with each other, but both frequency bands may not completely coincide with each other, in actual. For example, a primary band of the first field (L-STF, L-LTF, L-SIG, HE-SIG-A, and HE-SIG-B) corresponding to the first frequency band may be the same as the most portions of a frequency band of the second field (HE-STF, HE-LTF, and Data), but boundary surfaces of the respective frequency bands may not coincide with each other. As illustrated in FIGS. 4 to 6, since multiple null subcarriers, DC tones, guard tones, and the like are inserted during arranging the RUs, it may be difficult to accurately adjust the boundary surfaces.

The user (e.g., a receiving station) may receive the HE-SIG-A 730 and may be instructed to receive the downlink PPDU based on the HE-SIG-A 730. In this case, the STA may perform decoding based on the FFT size changed from the HE-STF 750 and the field after the HE-STF 750. On the contrary, when the STA may not be instructed to receive the downlink PPDU based on the HE-SIG-A 730, the STA may stop the decoding and configure a network allocation vector (NAV). A cyclic prefix (CP) of the HE-STF 750 may have a larger size than the CP of another field and the during the CP period, the STA may perform the decoding for the downlink PPDU by changing the FFT size.

Hereinafter, in the embodiment of the present invention, data (alternatively, or a frame) which the AP transmits to the STA may be expressed as a terms called downlink data (alternatively, a downlink frame) and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively. In the wireless LAN system to which the embodiment of the present description is applied, the whole bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, sub channels) or a plurality of resource units (RUs). The DL MU OFDMA transmission may be used together with the DL MU MIMO transmission. For example, the DL MU MIMO transmission based on a plurality of space-time streams (alternatively, spatial streams) may be performed on a specific subband (alternatively, sub channel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, sub channels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, sub channel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

As described above, in case the uplink transmission performed by each of the multiple STAs (e.g., non-AP STAs) is performed within the frequency domain, the AP may allocate different frequency resources respective to each of the multiple STAs as uplink transmission resources based on OFDMA. Additionally, as described above, the frequency resources each being different from one another may correspond to different subbands (or sub-channels) or different resource units (RUs).

The different frequency resources respective to each of the multiple STAs are indicated through a trigger frame.

Figure 9:
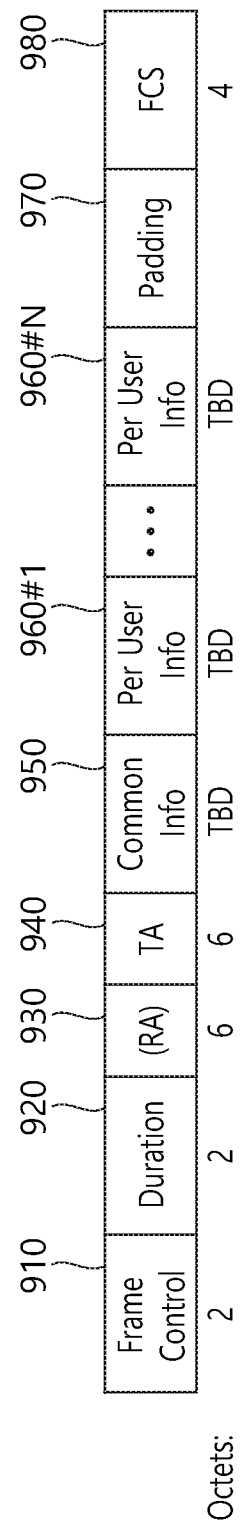
FIG. 9 illustrates an example of a trigger frame.

FIG. 9 illustrates an example of a trigger frame. The trigger frame of FIG. 9 allocates resources for Uplink Multiple-User (MU) transmission and may be transmitted from the AP. The trigger frame may be configured as a MAC frame and may be included in the PPDU. For example, the trigger frame may be transmitted through the PPDU shown in FIG. 3, through the legacy PPDU shown in FIG. 2, or through a certain PPDU, which is newly designed for the corresponding trigger frame. In case the trigger frame is transmitted through the PPDU of FIG. 3, the trigger frame may be included in the data field shown in the drawing.

Each of the fields shown in FIG. 9 may be partially omitted, or other fields may be added. Moreover, the length of each field may be varied differently as shown in the drawing.

A Frame Control field 910 shown in FIG. 9 may include information related to a version of the MAC protocol and other additional control information, and a Duration field 920 may include time information for configuring a NAV or information related to an identifier (e.g., AID) of the user equipment.

In addition, the RA field 930 may include address information of the receiving STA of a corresponding trigger frame, and may be optionally omitted. The TA field 940 includes address information of an STA (e.g., AP) for transmitting the trigger frame, and the common information field 950 includes common control information applied to the receiving STA for receiving the trigger frame. For example, information for controlling the content of a field indicating a length of an L-SIG field of an uplink PPDU transmitted in response to the trigger frame or an SIG-A (i.e., HE SIG-A field) of the uplink PPDU transmitted in response to the trigger frame may be included. Further, information regarding a length of a CP of the uplink PPDU transmitted in response to the trigger frame or information regarding a length of an LTF field may be included as common control information.

In addition, per user information fields 960#1 to 960#N corresponding to the number of receiving STAs for receiving the trigger frame of FIG. 9 are preferably included. The per user information field may be called an "RU allocation field".

In addition, the trigger frame of FIG. 9 may include a padding field 970 and a frame check sequence field 980.

Each of the per user information fields 960#1 to 960#N shown in FIG. 9 preferably includes a plurality of sub-fields.

Figure 10:
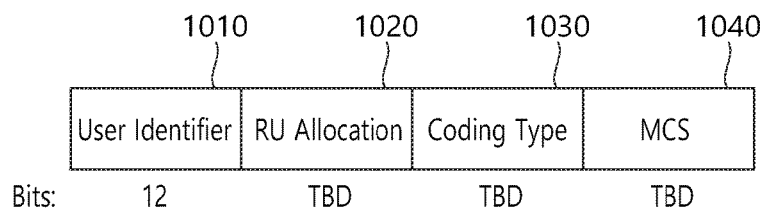
FIG. 10 illustrates an example of a sub-field included in a per user information field.

FIG. 10 illustrates an example of a sub-field included in a per user information field. Some parts of the sub-field of FIG. 10 may be omitted, and extra sub-fields may be added. Further, a length of each of the sub-fields shown herein may change.

A user identifier field 1010 of FIG. 10 indicates an identifier of an STA (i.e., a receiving STA) corresponding to per user information. An example of the identifier may be all or some parts of an AID.

In addition, an RU allocation field 1020 may be included. That is, if a receiving STA identified by the user identifier field 1010 transmits an uplink PPDU in response to the trigger frame of FIG. 9, the uplink PPDU is transmitted through an RU indicated by the RU allocation field 1020. In this case, the RU indicated by the RU allocation field 1020 preferably indicates the RU shown in FIG. 4, FIG. 5, and FIG. 6. A configuration of the RU allocation field 1020 is described below in detail.

The sub-field of FIG. 10 may include a coding type field 1030. The coding type field 1030 may indicate a coding type of an uplink PPDU transmitted in response to the trigger frame of FIG. 9. For example, if BCC coding is applied to the uplink PPDU, the coding type field 1030 may be set to '1', and if LDPC coding is applied, the coding type field 1030 may be set to '0'.

In addition, the sub-field of FIG. 10 may include an MCS field 1040. The MCS field 1040 may indicate an MCS scheme applied to the uplink PPDU transmitted in response to the trigger frame of FIG. 9. For example, if BCC coding is applied to the uplink PPDU, the coding type field 1030 may be set to '1', and if LDPC coding is applied, the coding type field 1030 may be set to '0'.

Hereinafter, the present specification proposes an example of improving a control field included in a PPDU. The control field improved by the present specification includes a first control field including control information required to interpret the PPDU and a second control field including control information for demodulating a data field of the PPDU. The first and second control fields may be various fields. For example, the first control field may be the HE-SIG-A 730 shown in FIG. 7, and the second control field may be the HE-SIG-B 740 shown in FIG. 7 and FIG. 8.

Hereinafter, an example of improving the first and second control fields is described in detail.

The following example proposes a control identifier inserted to the first control field or the second control field. The control identifier may have various sizes, and for example, may be implemented as 1-bit information.

If 20 MHz transmission is performed for example, the control identifier (e.g., 1-bit identifier) may indicate whether a 242-RU is allocated. An RU having various sizes may be used as shown in FIG. 4 to FIG. 6. The RU may be classified roughly into two types of RUs. For example, all RUs shown in FIG. 4 to FIG. 6 may be classified into an 26-type RU and a 242-type RU. For example, the 26-type RU may include a 26-RU, a 52-RU, and a 106-RU, and the 242-type RU may include a 242-RU, a 484-RU, and an RU having a larger size than the previous one.

The control identifier (e.g., 1-bit identifier) may indicate that the 242-type RU is used. That is, it may indicate that the 242-RU is included or the 484-RU or a 996-RU is included. If a transmission frequency band at which a PPDU is transmitted is a 20 MHz band, the 242-RU is a single RU corresponding to a full bandwidth of the transmission frequency band (i.e., 20 MHz). Accordingly, the control identifier (e.g., 1-bit identifier) may indicate whether the single RU corresponding to the full bandwidth of the transmission frequency band is allocated.

For example, if the transmission frequency band is a 40 MHz band, the control identifier (e.g., 1-bit identifier) may indicate whether a single RU corresponding to a full bandwidth (i.e., 40 MHz band) of the transmission frequency band is allocated. That is, whether the 484-RU is allocated for 40 MHz transmission may be indicated.

For example, if the transmission frequency band is an 80 MHz band, the control identifier (e.g., 1-bit identifier) may indicate whether a single RU corresponding to a full bandwidth (e.g., 80 MHz band) of the transmission frequency band is allocated. That is, whether the 996-RU is allocated for 80 MHz transmission may be indicated.

Various technical advantages can be achieved through the control identifier (e.g., 1-bit identifier).

First, through the control identifier (e.g., 1-bit identifier), it is possible to omit allocation information of the RU if a single RU corresponding to a full bandwidth of a transmission frequency band is allocated. That is, since only one RU is allocated to the full bandwidth of the transmission frequency band instead of a plurality of RUs, it is possible to omit the allocation information of the RU.

In addition, it can also be utilized as signaling for full bandwidth MU-MIMO. For example, if a single RU is allocated across a full bandwidth of the transmission frequency band, multiple users may be allocated to the single RU. That is, although a signal for each user is not divided in time and space, signals for several users may be multiplexed to the same single RU by using other schemes (e.g., spatial multiplexing). Accordingly, the control identifier (e.g., 1-bit identifier) may also be used to indicate whether to use the aforementioned full bandwidth MU-MIMO.

Figure 11:
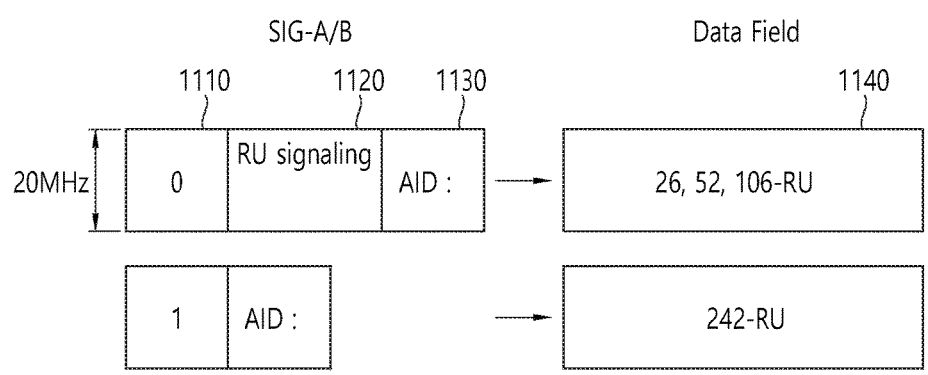
FIG. 11 is a block diagram illustrating an example of a control field and data field configured according to the present embodiment.

FIG. 11 is a block diagram illustrating an example of a control field and data field configured according to the present embodiment.

A left block of FIG. 11 indicates information included in a first and/or second control field of a PPDU, and a right block of FIG. 11 indicates information included in a data field of the PPDU. The PPDU related to FIG. 11 may be a PPDU for a multi-user, that is, a plurality of receiving devices. More specifically, a field configuration may vary for the multi-user and the single user, and the example of FIG. 11 may be a PPDU for the multi-user.

Although it is shown that the example of FIG. 11 is used for 20 MHz transmission, a bandwidth of a transmission frequency band is not limited thereto, and thus the present invention is also applicable to 40 MHz, 80 MHz, and 160 MHz transmission.

As shown in the left block of FIG. 11, the control identifier (e.g., 1-bit identifier) may be included in the first and/or second control fields. For example, if a control identifier 1110 is included in the first control field, information regarding allocation information 1120 for an RU may be included in the second control field. Further, identification information 1130 of a receiving device for receiving the PPDU of FIG. 11 may be included in the second control field. The identification information 1130 of the receiving device may indicate to which receiving device a data field 1140 corresponding to the second control field is allocated, and for example, may be implemented with an AID.

As shown in FIG. 11, the allocation information for the RU may be omitted in the second control field according to the control identifier (e.g., 1-bit identifier). For example, if the control identifier is set to "1", the allocation information 1120 for the RU may be omitted in the second control field, and the identification information 1130 of the receiving device may be included. Further, if the control identifier is set to "0", the allocation information 1120 for the RU may be included in the second control field, and the identification information 1130 of the receiving device may also be included.

The allocation information 1120 for the RU of FIG. 11 may be included in the common field of the SIG-B shown in FIG. 8, and the identification information 1130 of FIG. 11 may be included in the user-specific field of the SIG-B shown in FIG. 8.

In addition, referring to FIG. 11, common information such as RU signaling information, stream allocation related information, or the like for a user may be included in the common field of the SIG-B, and common information for all users receiving the PPDU of FIG. 11 may be included. If the aforementioned allocation information 1120 for the RU is omitted, there is a technical advantage in that an overhead is decreased.

According to another example, in case of using 20 MHz transmission, since 242-RU allocation may be regarded as single user (SU) transmission, the aforementioned control identifier (e.g., 1-bit identifier) may be omitted. In this case, a different operation may be performed according to a first control field (e.g., HE-SIG-A) SU/MU identification field. That is, if the SU/MU identification field included in the first control field indicates MU transmission, an example is possible in which the control identifier is omitted and only a 26-type RU is allocated.

Hereinafter, another example of the present embodiment is described.

Figure 12:
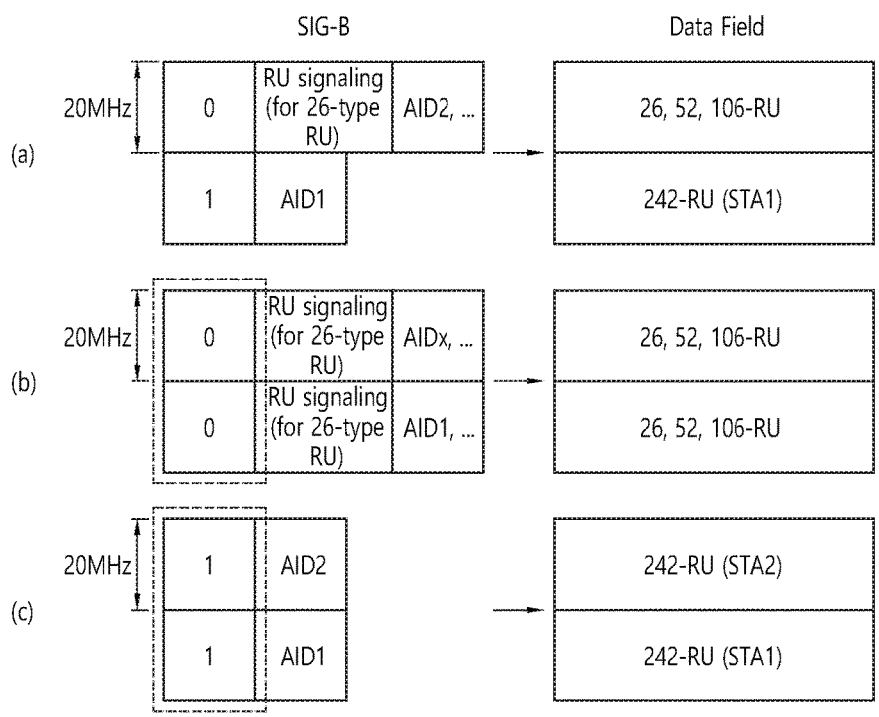
FIG. 12 illustrates an example of the present embodiment for 40 MHz transmission.

FIG. 12 illustrates an example of the present embodiment for 40 MHz transmission.

A left block of FIG. 12 indicates information corresponding to a first and/or second control field. For convenience, it is described hereinafter that the left block of FIG. 12 corresponds to the second control field (i.e., SIG-B), and a right block of FIG. 12 corresponds to a data field of a PPDU.

As illustrated, each control field and the data field correspond to a 20 MHz band.

In the example of FIG. 12, if the aforementioned control identifier (e.g., 1-bit identifier) is set to "1", allocation information for an RU may be omitted. In the example of FIG. 12, the control identifier (e.g., 1-bit identifier) may indicate whether a 242-RU (or 242-type RU) is used. Referring to FIG. 12, the control identifier is included in a front portion of a common field of the SIG-B. In the example of FIG. 12, the control identifier may be called a "242 unit bitmap". The same advantage as in FIG. 11 can be achieved in a sense that RU allocation information can be omitted according to the "242 unit bitmap", and also an overhead decrease effect can be achieved.

If only the 242-RU is allocated in all 40 MHz channels, the "242 unit bitmap" may be set to "1". Referring to the subfigure (b) of FIG. 12, if only the 26-type RU is allocated in the 40 MHz channel, the "242 unit bitmap" may be set to "00". Referring to the subfigure (c) of FIG. 12, if only the 242-RU is allocated in all 40 MHz channels, the "242 unit bitmap" may be set to "11". Since a last symbol of an SIG-B part needs to be aligned with a longest SIGB symbol of 20 MHz channels, an overhead decrease effect is small when RU allocation information is omitted only in any one 20 MHz channel. Accordingly, if only the 242-RU is allocated in all 20 MHz channels, an example is also possible in which the "242 unit bitmap" is set to "1".

Hereinafter, another example for the aforementioned control identifier (e.g., 1-bit identifier) is proposed. More specifically, it is proposed an example in which the aforementioned control identifier is classified into two identifiers. That is, the proposed identifier includes a first identifier indicating whether a 242-type RU is allocated for each 20 MHz channel and a second identifier indicating whether a 484-RU (or a different sized 242 type RU) is allocated in a corresponding 20 MHz.

Further, an improved example is proposed in regards to a frequency mapping relation between the second control field (i.e., SIG-B) and the data field. Although an additional example for the frequency mapping between the second control field (i.e., SIG-B) and the data field is also applicable to the aforementioned example (i.e., the example of FIG. 11 or FIG. 12), the following description is based on the example of FIG. 13 for convenience of explanation.

Figure 13:
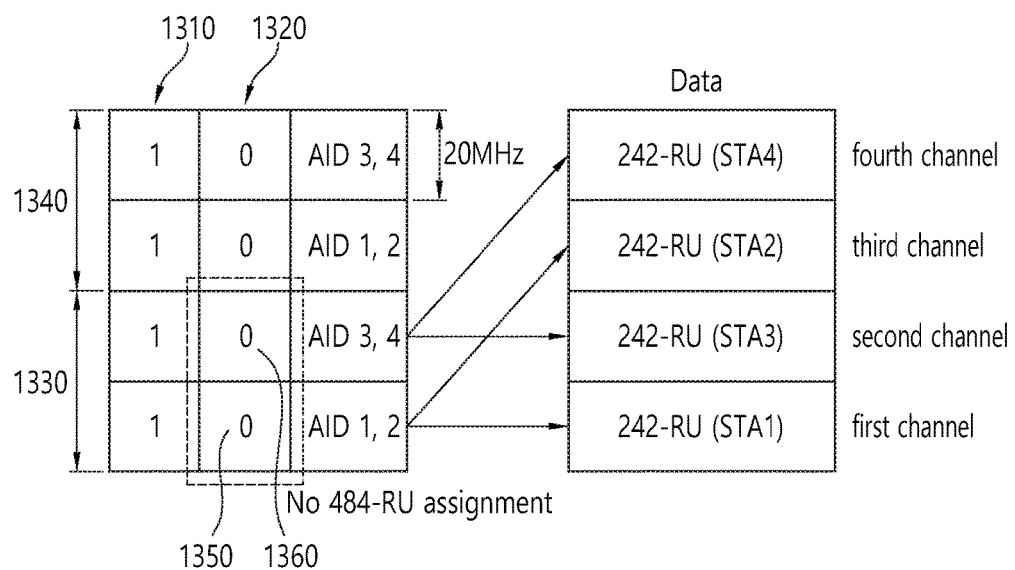
FIG. 13 illustrates an example in which the present specification is applied to 80 MHz transmission.

FIG. 13 illustrates an example in which the present specification is applied to 80 MHz transmission.

In the example of FIG. 13, a first identifier 1310 is configured for each 20 MHz channel That is, four 1-bit identifiers may be inserted to indicate whether a 242-type RU is allocated for each 20 MHz. In this case, since a 484-RU may be allocated in an 80 MHz band, an additional identifier indicating whether a specific 20 MHz channel (i.e., 242 chunk) is used for the 242-RU or is used for the 484-RU, that is, the aforementioned second identifier 1320, may be additionally included. If both of the first and second identifiers are used, total 8-bit information may be used for the first/second identifiers in the 80 MHz band.

The first and second identifiers may also be expressed as a "242 unit bitmap" and a "484 unit assignment indication field". The first and second identifiers may also be implemented as a 2-bit field. For example, if a second identifier 1350 corresponding to a first channel and a second identifier 1360 corresponding to a second channel are set to "00", this means that the 484-RU is not allocated in a corresponding PPDU. For example, if the first and second identifiers are set to "1" and "0", it may indicate that only the 242-RU is allocated.

The example of FIG. 13 relates to the first identifier 1310 and second identifier 1320 as illustrated. However, an example for a frequency mapping relation between the second control field (i.e., SIG-B) and the data field may be additionally applied.

More specifically, the second control field (i.e., SIG-B) may be configured separately for each 20 MHz channel. However, the present specification proposes an example of independently configuring lower two 20 MHz channels 1330 and upper two 20 MHz channels 1340. More specifically, an example is proposed in which the SIG-B corresponding to the upper or lower two 20 MHZ channels is configured and is then duplicated to be used for the remaining two 20 MHz channels.

All or some parts of the field proposed in the present specification, for example, the SIG-B, are preferably configured according to the aforementioned duplication method. For example, if four 20 MHz channels shown in the example of FIG. 13 are classified into first to fourth channels in an orderly manner from bottom to top, an SIG-B included in the first and second channels may have the same content as an SIG-B included in the third and fourth channels. In this case, it is assumed that the first channel has a lowest frequency index, and the second to fourth channels are located in an ascending order. Further, as illustrated, an SIG-B corresponding to the second channel first displays an AID3 corresponding to an STA3, and thereafter displays an AID4 corresponding to an STA4. Accordingly, the SIG-B corresponding to the second channel may allocate the STA3 to a data field corresponding to the second channel, and may allocate the STA4 to a data field corresponding to the fourth channel That is, the SIG-B corresponding to the second channel may first indicate STA identification information regarding the data field corresponding to the second channel, and thereafter may indicate STA identification information regarding the data field corresponding to the fourth channel.

In addition, referring to FIG. 13, the SIG-B corresponding to the first channel may indicate the data field corresponding to the first channel and indicate an STA (i.e., STA1) allocated to the data field corresponding to the first channel, or may indicate the data field corresponding to the third channel and indicate an STA (i.e., STA2) allocated to the data field corresponding to the third channel That is, the SIG-B included in the first channel may indicate the STA identification information regarding the data field corresponding to the first channel, and may indicate the STA identification information regarding the data field corresponding to the third channel.

Figure 14:
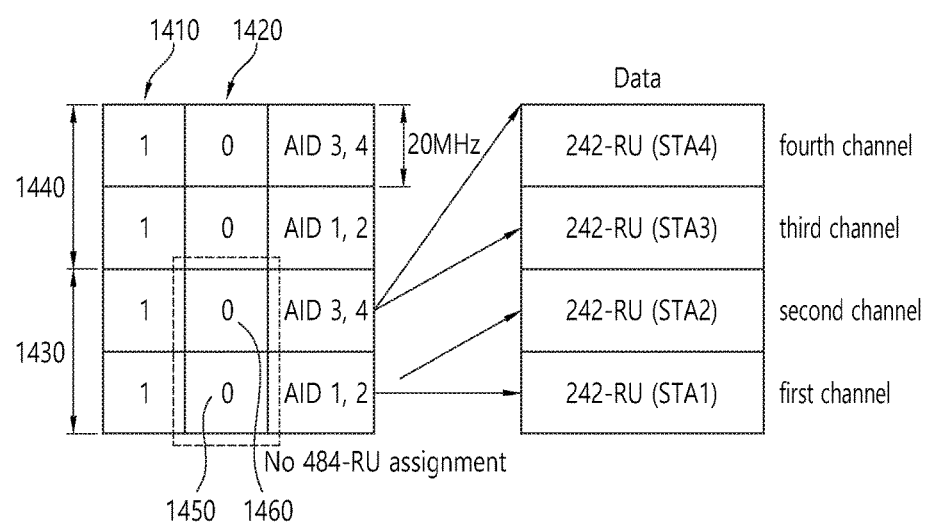
FIG. 14 illustrates an example of modifying a control signal according to the present specification.

FIG. 14 illustrates another example according to the present specification.

Referring to FIG. 14, a first identifier 1410 is included in a head portion of an SIG-B field corresponding to each 20 MHz, followed by a second identifier 1420.

The first/second identifiers of FIG. 14 may be used in the same manner as the first/second identifiers of FIG. 13. Further, the example of FIG. 14 may have a predetermined mapping relation between the SIG-B and the data field similarly to the example of FIG. 13. However, the example of FIG. 14 differs from the example of FIG. 13 in a sense that the SIG-B corresponding to the first channel is mapped to the data field corresponding to the first/second channels, and the SIG-B corresponding to the second channel is mapped to the data field corresponding to the third/fourth channels.

Figure 15:
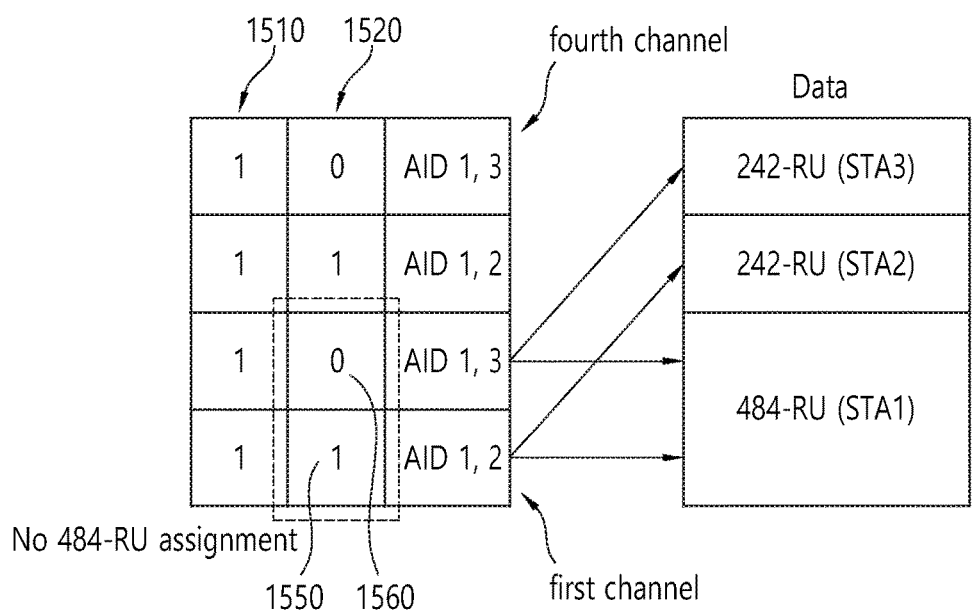
FIG. 15 illustrates an additional example of modifying a control signal according to the present specification.

FIG. 15 illustrates another example according to the present specification.

Referring to FIG. 15, a first identifier 1510 is included in a head portion of an SIG-B field corresponding to each 20 MHz, followed by a second identifier 1520. The first/second identifiers according to the example of FIG. 15 may correspond to the first/second identifiers of FIG. 13 and/or FIG. 14.

As shown in FIG. 15, all or some parts of information of the SIG-B field corresponding to first/second channels may be duplicated to third/fourth channels. That is, as shown in FIG. 15, the SIG-B field corresponding to the first/second channels indicates {AID1, 2} and {AID1, 3}. The SIG-B field corresponding to the third/fourth channels may also indicate {AID1, 2} and {AID1, 3}.

Referring to FIG. 15, a second identifier 1550 corresponding to the first channel indicates "1", and a second identifier 1560 corresponding to the second channel indicates "0". This indicates that a 484-RU is allocated to the first/second channels, and the 484-RU is not allocated to the third/fourth channels. Since all of the first identifiers 1501 are set to 1 in the example of FIG. 15, eventually, in the data field of FIG.

15, a 484-RU is allocated to the first/second channels, a 242-RU is allocated to the third channel, and 282-RU is also allocated to the fourth channel.

Extra other features of FIG. 15 are the same as those in the example of FIG. 13 and FIG. 14.

Figure 16:
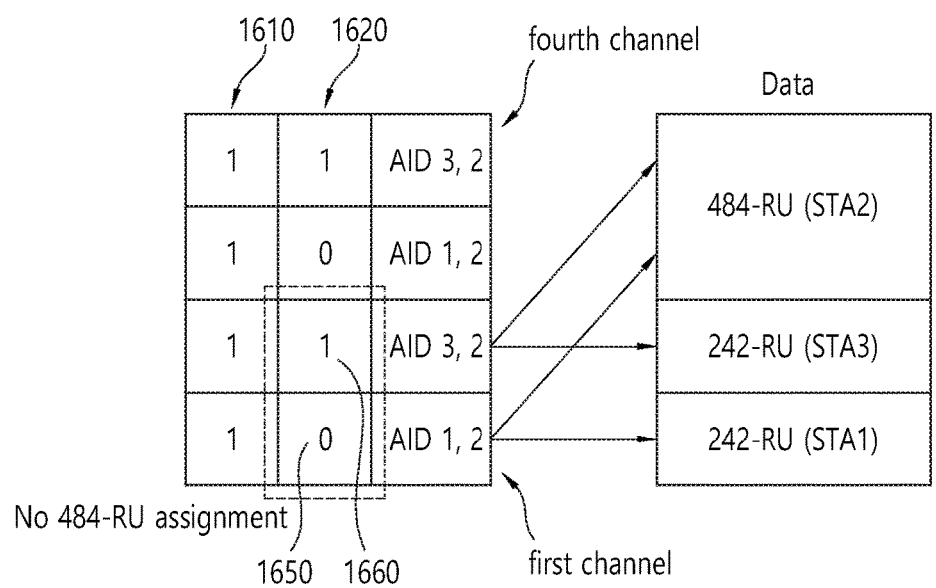
FIG. 16 illustrates an example of modifying a control signal and frequency mapping relation according to the present specification.

FIG. 16 illustrates another example according to the present specification.

Referring to FIG. 16, a first identifier 1610 is included in a head portion of an SIG-B field corresponding to each 20 MHz, followed by a second identifier 1620.

As shown in FIG. 16, all or some parts of information of the SIG-B field corresponding to first/second channels may be duplicated to third/fourth channels. That is, as shown in FIG. 16, the SIG-B field corresponding to the first/second channels indicates {AID1, 2} and {AID3, 2}. The SIG-B field corresponding to the third/fourth channels may also indicate {AID1, 2} and {AID3, 2}.

Referring to FIG. 16, a second identifier 1650 corresponding to the first channel indicates "0", and a second identifier 1660 corresponding to the second channel indicates "1". This indicates that a 484-RU is not allocated to the first/second channels, and the 484-RU is allocated to the third/fourth channels. Since all of the first identifiers 1601 are set to 1 in the example of FIG. 16, eventually, in the data field of FIG. 16, a 242-RU is allocated to the first/second channels, and the 484-RU is allocated to the third/fourth channels.

Extra other features of FIG. 16 are the same as those in the example of FIG. 13 to FIG. 15.

Figure 17:
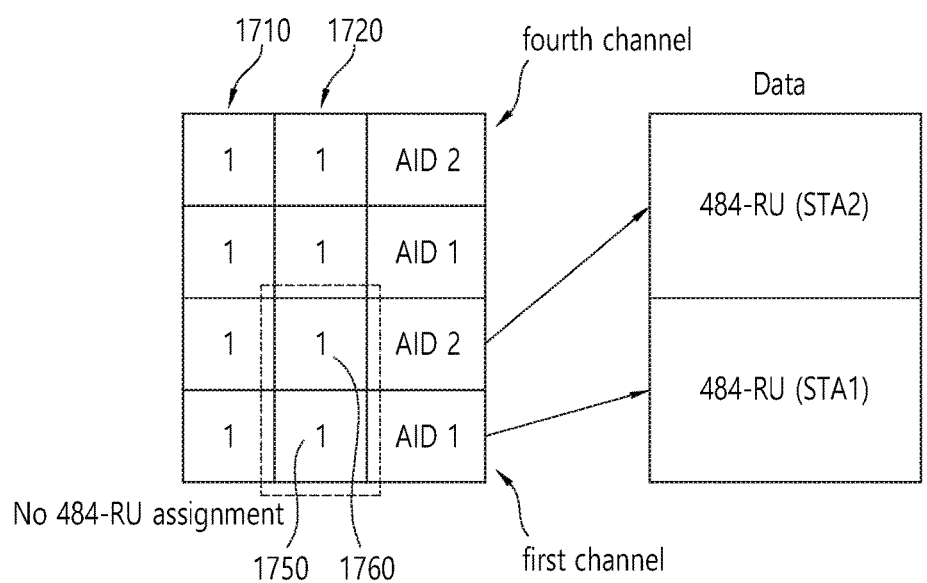
FIG. 17 illustrates an example of modifying a control signal and frequency mapping relation according to the present specification.

FIG. 17 illustrates another example according to the present specification.

Referring to FIG. 17, a first identifier 1710 is included in a head portion of an SIG-B field corresponding to each 20 MHz, followed by a second identifier 1720.

As shown in FIG. 17, all or some parts of information of the SIG-B field corresponding to first/second channels may be duplicated to third/fourth channels. That is, as shown in FIG. 17, the SIG-B field corresponding to the first/second channels indicates {AID1} and {AID2}. The SIG-B field corresponding to the third/fourth channels may also indicate {AID1} and {AID2}.

Referring to FIG. 17, a second identifier 1750 corresponding to the first channel indicates "1", and a second identifier 1760 corresponding to the second channel indicates "1". This indicates that a 484-RU is not allocated to the first/second channels, and the 484-RU is allocated to the third/fourth channels.

Extra other features of FIG. 17 are the same as those in the example of FIG. 13 to FIG. 16.

Figure 18:
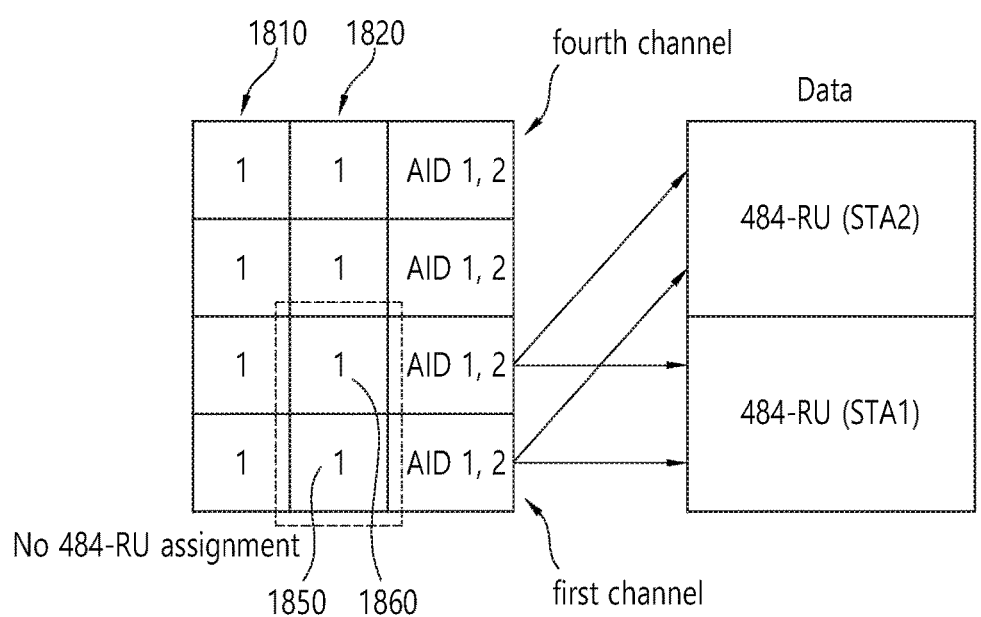
FIG. 18 illustrates an additional example of a control signal and frequency mapping relation according to the present specification.

FIG. 18 illustrates another example according to the present specification.

Referring to FIG. 18, a first identifier 1810 is included in a head portion of an SIG-B field corresponding to each 20 MHz, followed by a second identifier 1820.

As shown in FIG. 18, all or some parts of information of the SIG-B field corresponding to first/second channels may be duplicated to third/fourth channels. That is, as shown in FIG. 18, the SIG-B field corresponding to the first/second channels indicates {AID1, 2} and {AID1, 2}. The SIG-B field corresponding to the third/fourth channels may also indicate {AID1, 2} and {AID1, 2}.

Referring to FIG. 18, a second identifier 1850 corresponding to the first channel indicates "1", and a second identifier 1860 corresponding to the second channel indicates "1". This indicates that a 484-RU is not allocated to the first/second channels, and the 484-RU is allocated to the third/fourth channels.

Extra other features of FIG. 18 are the same as those in the example of FIG. 13 to FIG. 17.

Figure 19:
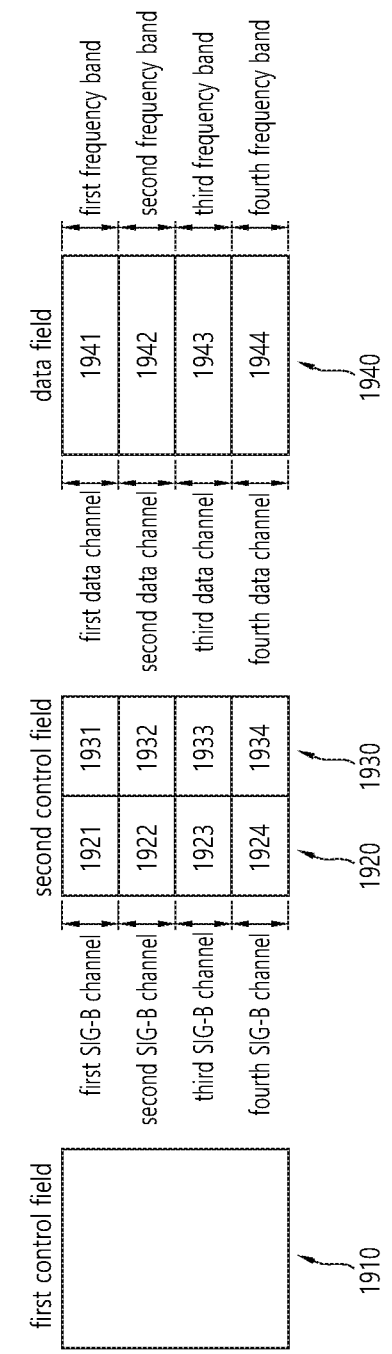
FIG. 19 illustrates a relation of SIG-A, SIG-B, and data fields according to the present embodiment.

FIG. 19 illustrates a relation of SIG-A, SIG-B, and data fields according to the present embodiment. The aforementioned content is described on one PPDU in an example of FIG. 19.

A PPDU 1901 of FIG. 19 may include all or some parts of the field shown in FIG. 7. More specifically, as illustrated, it may include a first control field 1910, second control fields 1920 and 1930, and a data field 1940. The first control field 1910 may correspond to the aforementioned SIG-A or HE-SIG-A, and the second control field 1920 may correspond to the aforementioned SIG-B or HE-SIG B.

The first control field 1910 may include the HE-SIG A 730 of FIG. 7 and a technical feature shown in FIG. 11 to FIG. 18. More specifically, the first control field 1910 may include control information for interpreting the PPDU 1901. For example, as described in the example of FIG. 7, the PPDU 1901 may include a sub-field indicating a transmission frequency band at which the PPDU 1901 is transmitted (i.e., indicating 20 MHz, 40 MHz, 80 MHz, 160 MHz, etc.).

Further, a control identifier (e.g., a first identifier and/or a second identifier) described in FIG. 11 to FIG. 18 may be included. More specifically, the first control field 1910 may include a 1-bit identifier indicating whether a single RU corresponding to a full bandwidth of the transmission frequency band is allocated. If the control identifier (e.g., 1-bit identifier) of the first control field 1910 is set to "1", it indicates that a single RU corresponding to the full bandwidth of the transmission frequency band is allocated. That is, if the transmission frequency band is a 20 MHz band, it indicates that a single 242-RU is allocated, and for example, if the transmission frequency band is an 80 MHz band, it indicates that a single 996-RU is allocated. Meanwhile, as described above, the 1-bit identifier has a technical advantage in that signaling for full bandwidth MU-MIMO is possible.

If the example of FIG. 19 is applied to 80 MHz transmission, the first control field 1910 may be included in the PPDU 1901 in such a manner of being generated in unit of 20 MHz and thereafter being duplicated on the basis of the transmission frequency band. That is, the first control field 1910 may be generated in unit of 20 MHz, and may be duplicated according to an 80 MHz band.

The second control field may correspond to the HE-SIG B field including the common field and user specific field shown in FIG. 8. That is, the second control field may include the common field 1920 and the user specific field 1930. As described above, common information such as RU allocation information for a user may be included in the common field 1920 of the SIG-B. For example, RU allocation information having a form of a look-up table including specific n-bit mapping information may be included. The RU allocation information may indicate arrangement or allocation information of an RU applied to the corresponding data field 1940. That is, a structure in which a plurality of RUs are arranged may be indicated as shown in FIG. 4 to FIG. 6. All STAs which have received the common field 1920 of the second control field may confirm a specific RU by which the corresponding data field 1940 is configured.

In summary, the second control field generally includes allocation information for a resource unit (RU) through the common field 1920. However, if a control identifier (e.g., 1-bit identifier) included in the first control field 1910 is set to "1", the allocation information for the RU is preferably omitted. That is, the common field 1920 may be omitted. Since only a single RU is used when the control identifier is set to "1", there is no need to configure allocation information for the RU, and thus the common field 1920 can be omitted. In other words, if the control identifier (e.g., 1-bit identifier) included in the first control field 1910 is set to "0", the common field 1920 of the second control field may include allocation information for the RU, and if the control identifier (e.g., 1-bit identifier) included in the first control field 1910 is set to "1", the common field 1920 of the second control field may not include the allocation information of the RU.

The second control fields 1920 and 1930 are used to demodulate the data field 1940. In this case, the second control field and the data field 1940 may have a mapping relation as shown in FIG. 13 to FIG. 18.

For example, if the example of FIG. 19 relates to 80 MHz transmission, the second control field may correspond to first to fourth SIG-B channels. That is, the channel may be classified into four channels in unit of 20 MHz.

In this case, the content of second control fields 1921 and 1931 corresponding to the first SIG-B channel may be the same as the content of second control fields 1912 and 1933 corresponding to the third SIG-B channel. In other words, some parts of the second control field may be duplicated in the PPDU 1901. The duplication for the second control field may be implemented in various manners.

For convenience of explanation, four second control fields corresponding to the first to fourth SIG-B channels may be called first, second, third, and fourth signal fields. In this case, second signal fields 1922 and 1932 may be duplicated to construct fourth signal fields 1924 and 1934. That is, the content of the second control fields 1922 and 1932 corresponding to the second SIG-B channel may be the same as the content of the second control fields 1924 and 1934 corresponding to the fourth SIG-B channel.

When such a duplication is performed, the first signal fields 1921 and 1931 may correspond to a data field 1941 of the first data channel and a data field 1943 of the third data channel. Further, the second signal fields 1922 and 1932 may correspond to a data field 1942 of the second data channel and a data field 1944 of the fourth data channel.

In other words, the common field 1921 included in the first signal fields 1920 and 1931 may indicate allocation information for an RU applied to the data field 1941 of the first data channel and allocation information for an RU applied to the data field 1943 of the third data channel. In this case, the allocation information for the RU applied to the data field 1941 of the first data channel is first inserted in a form of one BCC block in the first signal fields 1921 and 1931, and thereafter one BCC block for the data field 1943 of the third data channel is inserted.

Further, the user specific field 1931 included in the first signal fields 1921 and 1931 may include identification information (e.g., AID) of an STA allocated to the data field 1941 of the first data channel and identification information (e.g., AID) of an STA allocated to the data field 1943 of the third data channel. In this case, the aforementioned two BCC blocks are inserted into the first signal fields 1921 and 1931 and then a BCC block for an STA allocated to the data field 1941 of the first data channel is inserted. Thereafter, a BCC block for an STA allocated to the data field 1943 of the third data channel is inserted.

In FIG. 19, although a frequency band at which the second control fields 1920 and 1930 are transmitted is indicated by four "SIG-B channels" and a frequency band at which the data field 1940 is transmitted is indicated by four "data channels", it may be interpreted that each SIG-B channel and data channel correspond to the four frequency bands described in FIG. 7. That is, as described in the example of FIG. 7, each boundary surface of the data channel and each boundary surface of the SIG-B channel may not be completely aligned. However, when it is described based on a corresponding 20 MHz frequency band, the second control fields 1921 and 1931 corresponding to a first frequency band correspond to the two data fields 1941 and 1943 corresponding to the first/third frequency bands. Further, the second control fields 1922 and 1932 corresponding to the second frequency band correspond to the two data fields 1942 and 1944 corresponding to the second/fourth frequency bands.

Figure 20:
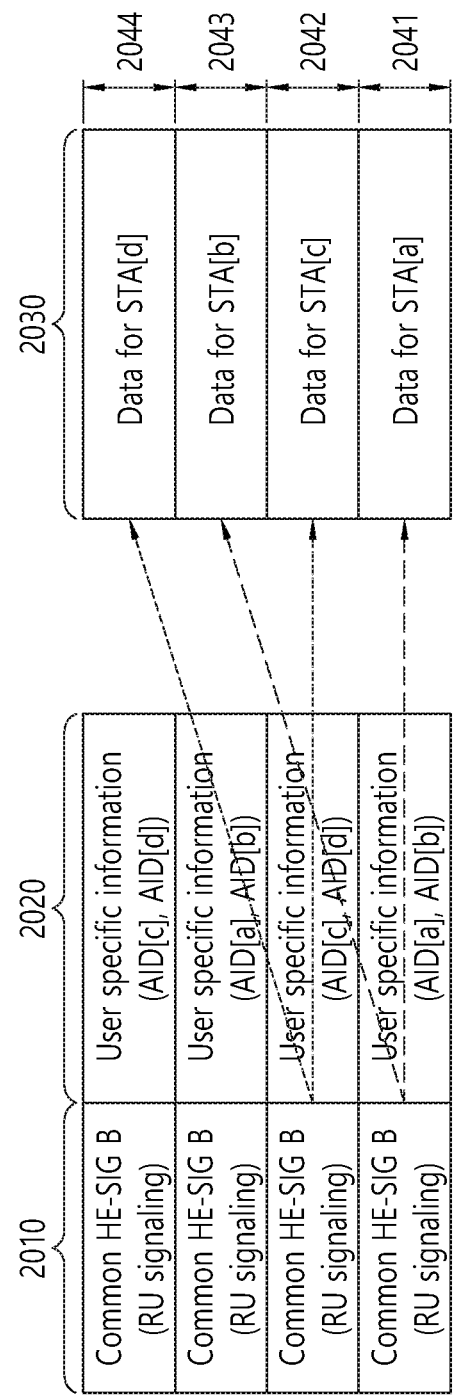
FIG. 20 illustrates an example of SIG-B used for 80 MHz transmission.

FIG. 20 illustrates an example of SIG-B used for 80 MHz transmission.

The example of FIG. 19 is further specified in the example of FIG. 20. As shown in FIG. 20, the SIG-B includes a common field 2010 and a user specific field 2020. Further, the common field 2010 and user specific field 2020 of the SIG-B include four fields respectively corresponding to four frequency bands 2041, 2042, 2043, and 2044 each of which corresponds to a 20 MHz channel. The four distinctive SIG-B fields in FIG. 20 may be called in various terms such as first to fourth signal fields or the like.

In case of being divided in unit of a 20 MHz band as shown in FIG. 20, it is preferable that the SIG-B corresponding to the first frequency band 2041 is mapped to data fields of first and third frequency bands, and the SIG-B corresponding to the second frequency band 2042 is mapped to data fields of the second and fourth frequency bands. Further, the SIG-B corresponding to the first frequency band 2041 may be duplicated to construct the SIG-B corresponding to the third frequency band 2043, and the SIG-B corresponding to the second frequency band 2042 may be duplicated to construct the SIG-B corresponding to the fourth frequency band 2044.

Referring to FIG. 20, the common field corresponding to the first frequency band 2041 includes an RU signalling field, and this is used for the data field corresponding to the first and third frequency bands. Each RU signalling field shown in FIG. 20 may be constructed of one look-up table with respect to 20 MHz. Since the common field corresponding to the first frequency band 2041 corresponds to the data field corresponding to two frequency bands, two RU signalling fields may be simultaneously transmitted. A first field of the two RU signalling fields indicates the data field corresponding to the first frequency band 2041, and a second field indicates the data field corresponding to the third frequency band 2043.

The same technical feature is also applied to the SIG-B corresponding to the second frequency band 2042. That is, the SIG-B corresponding to the second frequency band 2042 may include two RU signalling fields for the data field corresponding to the second and fourth frequency bands 2042 and 2044.

The two RU signalling fields may correspond to one unified look-up table instead of being present independently with each other. That is, it may be designed to instruct non-contiguous 40 MHz allocation.

As described above, the SIG-B corresponding to the first and second frequency bands is preferentially duplicated on the third and fourth frequency bands.

Figure 21:
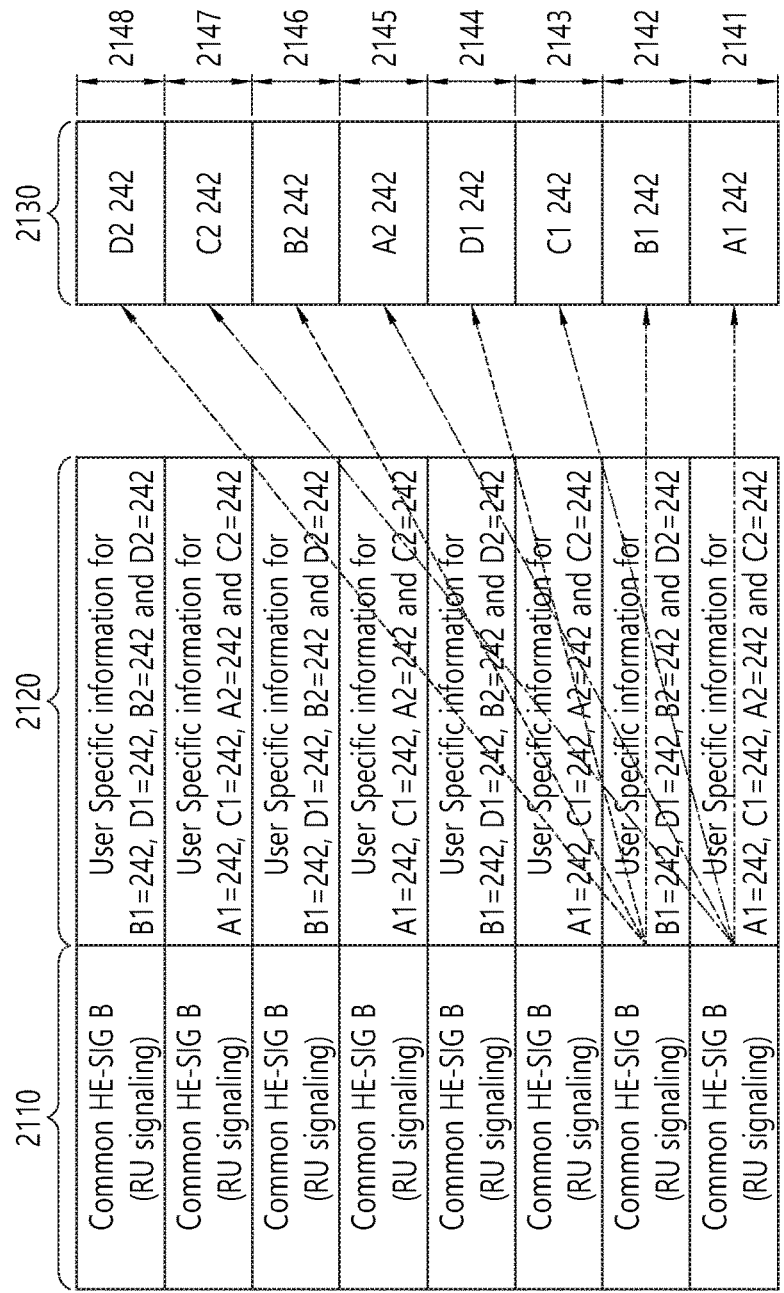
FIG. 21 illustrates an example of SIG-B used for 160 MHz transmission.

FIG. 21 illustrates an example of SIG-B used for 160 MHz transmission.

When the SIG-B is transmitted over 160 MHz, a control field transmitted over first 40 MHz may be transmitted in a duplicated form. As shown in FIG. 21, the SIG-B includes a common field 2110 and a user specific field 2120. The common field 2010 and the user specific field 2020 of the SIG-B each include eight fields respectively corresponding to eight frequency bands 2141, 2142, 2143, 2144, 2145, 2146, 2147, and 2148, each of which corresponds to a 20 MHz channel. The eight divided SIG-B fields in FIG. 21 may be referred to as various terms, for example, first to eighth signal fields, respectively.

When the SIB-B is divided into 20 MH-band fields as shown in FIG. 21, it is preferable that an SIG-B field corresponding to a first frequency band 2141 is mapped to data fields of first, third, fifth, and seventh frequency bands, and an SIG-B field corresponding to a second frequency band 2142 is mapped to data fields of second, fourth, sixth and eighth frequency bands. In addition, the SIG-B field corresponding to the first frequency band 2141 may be duplicate to construct SIG-B fields corresponding to the third, fifth, and seventh frequency bands 2143, 2145, and 2147, while the SIG-B field corresponding to the second frequency band 2142 may be duplicated to construct SIG-B fields corresponding to the fourth, sixth, and eighth frequency bands 2144, 2146, and 2148.

Referring to FIG. 21, a common field corresponding to the first frequency band 2141 includes an RU signaling field, which is used for the data fields corresponding to the first, third, fifth and seventh frequency bands. Each RU signaling field shown in FIG. 21 may be configured in one look-up table based on 20 MHz. Since the common field corresponding to the first frequency band 2141 corresponds to a data field corresponding to four frequency bands, four RU signaling fields may be simultaneously transmitted. A first field among the four RU signaling fields indicates a data field corresponding to the first frequency band 2141; a second field indicates a data field corresponding to the third frequency band 2143; a third field indicates a data field corresponding to the fifth frequency band 2145; and a fourth field indicates a data field corresponding to the seventh frequency band 2147.

The same technical feature also applies to the SIG-B portion corresponding to the second frequency band 2142. That is, the SIG-B portion corresponding to the second frequency band 2142 may include four RU signaling fields for the data fields corresponding to the second, fourth, sixth, and eighth frequency bands 2142, 2144, 2146 and 2148.

Four RU signaling fields may correspond to a single unified look-up table, instead of existing independently of each other. That is, it may be designed to instruct non-contiguous 80 MHz allocation.

As described above, the SIG-B fields corresponding to the first and second frequency bands is preferentially duplicated on the third and fourth frequency bands, on the fifth and sixth frequency bands, and on the seventh and eighth frequency bands.

Hereinafter, a case is considered in which an AP transmits data to each STA using DL OFDMA through a 40 MHz, 80 MHz, or 80+80/160 MHz band. Here, when the STA has a capability for a 20 MHz band only, a channel for a 20 MHz-only STA used by the AP for transmission and a method for indicating the channel are proposed.

That is, a method for efficiently transmitting data between an STA, which receives data using a channel corresponding to a particular 20 MHz subband, and an AP using a wider band is proposed.

It is assumed that a 20 MHz-only STA always uses a primary 20 MHz channel unless indicated otherwise.

Specifically, a particular 20 MHz subband may be allocated only to STAs having only a capability for a 20 MHz band. The STAs having only the capability for the 20 MHz band may receive only a PPDU corresponding to the band thereof. Here, when the AP transmits an OFDMA PPDU in a wider band, the STAs may not receive the PPDU corresponding to the band supported by the AP.

Therefore, the following techniques are proposed to solve such a problem in data transmission/reception between the STAs and the AP using DL OFDMA.

Embodiment 1

For example, when the AP transmits data to each of 20 MHz-only STAs using DL OFDMA through the 40 MHz, 80 MHz, or 80+80/160 MHz band, the 20 MHz-only STAs may always be allocated RUs in a primary 20 MHz channel to receive the data.

This embodiment does not require additional signaling for channel indication. However, bandwidth efficiency is poor.

Embodiment 2

For another example, a common field of SIG-B may indicate an RU schedule (RU signaling) for a 20 MHz-only STA. For instance, in 80 MHz transmission as shown in FIG. 13, there are four 20 MHz channels (first to fourth channels) in total, information on channels 1 and 3 is transmitted via channel 1 (or channel 3), and information on channels 2 and 4 is transmitted via channel 2 (or channel 4). That is, to avoid additional signaling overhead, data is transmitted to a 20 MHz-only STA through a primary 20 MHz channel or a channel corresponding to the primary 20 MHz channel.

For example, when the primary 20 MHz channel is channel 1, the corresponding channel is channel 3; and when the primary 20 MHz channel is channel 2, the corresponding channel is channel 4.

However, this embodiment may have hardware difficulty of needing to instantaneously change a center frequency.

In the following technique, channel indication is required for a 20 MHz-only STA, and signaling for channel indication may be performed through HE-SIG-A.

Embodiment 3

For example, when transmitting data to a 20 MHz-only STA, any channel may be allocated to increase bandwidth efficiency. A signaling method according to this embodiment may have two types (signaling option 1 and signaling option 2).

Signaling option 1: HE-SIG-A has bit numbers depending on bandwidth as below in Table 1. In this case, all 20 MHz-only STAs use a single channel to transmit and receive data.

TABLE 1

| BW | 40 MHz | 80 MHz | 160 MHz |
|---|---|---|---|
| Bitwidth | 1 | 2 | 3 |

However, signaling option 1 has the greatest overhead for signaling.

In addition, signaling option 1 may construct the following two examples.

In signaling option 1, entries may be configured as in the following table in order from primary 20 MHz to secondary 80 MHz (example 1).

TABLE 2

| BW | Bit-width | Entry |
|---|---|---|
| 40 MHz | 1 | 0: primary20, 1: secondary20 |
| 80 MHz | 2 | 0: primary20, 1: secondary20, |
|  |  | 2: Counter of primary20 in Secondary40, |
|  |  | 3: Counter of secondary20 in Secondary40 |
| 160 MHz | 3 | 0: primary20, 1: secondary20, |
|  |  | 2: Counter of primary20 in Secondary40, |
|  |  | 3: Counter of secondary20 in Secondary40, |
|  |  | 4: Counter of primary20 in Secondary80, |
|  |  | 5: Counter of secondary20 in Secondary80, |
|  |  | 6: Counter of the channel for entry 2 in Secondary80 |
|  |  | 7: Counter of the channel for entry 2 in Secondary80 |

In addition, signaling option 1 may configure entries as in the following table, assuming that channel indexes are arranged in ascending or descending order of frequencies (example 2).

TABLE 3

| BW | Bit-width | Entry |
|---|---|---|
| 40 MHz | 1 | 0: channel1, 1: channel2 |
| 80 MHz | 2 | 0: channel1, 1: channel2, 2: channel3, 3: channel4 |
| 160 MHz | 3 | 0: channel1, 1: channel2, 2: channel3, 3: channel4, |
|  |  | 4: channel5, 5: channel6, 6: channel7, 7: channel8 |

Further, in embodiment 1 and embodiment 2, three bits and entries of 160 MHz may also be used for 40 MHz and 80 MHz for unification.

Signaling option 2: A 20 MHz-only STA may identify which channel the STA belongs to only by reading primary 20 MHz or secondary 20 MHz using information on RU scheduling in HE-SIG-B. In this case, only one bit is needed, and the 20 MHz-only STA determines using this bit whether to read primary 20 MHz or secondary 20 MHz. In this case, all 20 MHz-only STAs may transmit and receive data through primary 20 MHz or a channel corresponding to primary 20 MHz, or may transmit and receive data through secondary 20 MHz or a channel corresponding to secondary 20 MHz.

In signaling option 2, entries may be configured as in the following table.

TABLE 4

| Entry | Example 1 | Example 2 |
|---|---|---|
| 0 | Primary20 | Channel1 |
| 1 | Secondary20 | Channel2 |

In Table 4, it is assumed that primary 20 MHz and secondary 20 MHz are arranged in ascending or descending order of frequencies in example 2 of signaling option 2, as in example 2 of signaling option 1.

Signaling option 2 may be implemented with a small number of bits to reduce signaling overhead. However, signaling option 2 needs to instantaneously change a center frequency, thus causing a burden on hardware.

Embodiment 4

For still another example, data transmission and reception may be performed using only primary 20 MHz and secondary 20 MHz through a one-bit indicator in order to reduce signaling overhead and a burden on hardware. In this embodiment, entries may be configured as in the following table.

TABLE 5

| Entry | Example 1 | Example 2 |
|---|---|---|
| 0 | Primary20 | Channel1 |
| 1 | Secondary20 | Channel2 |

In Table 5, it is assumed that primary 20 MHz and secondary 20 MHz are arranged in ascending or descending order of frequencies in example 2, as in signaling options 1 and 2.

In this embodiment, all 20 MHz-only STAs may transmit and receive data only using a primary 20 MHz or only using a secondary 20 MHz channel. Here, bandwidth efficiency decreases with an increase in bandwidth.

The following table illustrates contents of HE-SIG-A for an HE MU PPDU.

TABLE 6

| Field | Number of bits |
|---|---|
| DL/UL | 1 |
| BSS color | 6 |
| Spatial Reuse | 4 |
| TXOP duration | 7 |
| BW | 3 |
| SIGB MCS | 3 |
| SIGB DCM | 1 |
| Number of HE-SIGB symbols or MU MIMO users | 4 |
| SIG compression | 1 |
| Number of HE-LTF symbols | 3 |
| CP + LTF size | 2 |
| LDPC extra symbol | 1 |
| PE | 3 |
| Doppler | 1 |
| STBC | 1 |
| CRC | 4 |
| Tail | 6 |
| total bits | 51 |

As illustrated in Table 6, only one bit is practically available for channel indication for a 20 MHz-only STA. Therefore, signaling option 1 of the aforementioned embodiment 3 is unavailable. In signaling option 2 of embodiment 3 and in embodiment 4, the channel indication bits for a 20 MHz-only STA are included in the contents of Table 6. That is, the channel indication bit for the 20 MHz-only STA is included in the HE-SIG-A. The channel indication bit for the 20 MHz-only STA is one bit, and each entry is described in Table 4 and Table 5.

Figure 22:
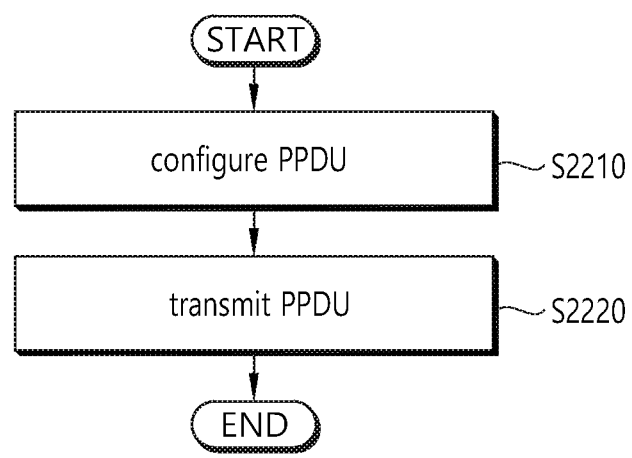
FIG. 22 is a procedural flowchart to which the aforementioned example may be applied.

FIG. 22 is a procedural flowchart to which the aforementioned example may be applied.

An example of FIG. 22 may be applied to a transmission device. For example, the transmission device may correspond to an AP STA, and a reception device may correspond to a non-AP STA. In the present embodiment, the transmission device may transmit a PPDU through a wider band, such as a 40 MHz, 80 MHz, or 80+80/160 MHz band, while the reception device may have a capability only for a narrow band, such as a 20 MHz band. In FIG. 22, it is assumed that the transmission device transmits a PPDU through an 80 MH band, and the reception device has a capability for a 20 MHz band only.

The example of FIG. 22 may also be applied in a WLAN system using at least one RU corresponding to a preset frequency band.

In operation S2210, the transmission device configures a PPDU including first to fourth data fields corresponding to first to fourth frequency bands. According to the example of FIG. 22, the first to fourth frequency bands may each correspond to a 20 MHz band.

In operation S2220, the transmission device transmits the PPDU to the reception device.

Specifically, the PPDU further includes a first control field and a second control field. The first control field may correspond to an HE-SIG-A field, and the second control field may correspond to an HE-SIG-B field.

The first control field includes an indicator for determining a frequency band used by the reception device when the reception device has only a capability for a 20 MHz band. The indicator indicates the first frequency band or the second frequency band. Here, the first frequency band may correspond to primary 20 MHz, and the second frequency band may correspond to secondary 20 MHz.

The reception device having only the capability for the 20 MHz band may decode the PPDU only for a narrow band in order to save power. If the reception device having only the capability for the 20 MHz band always uses the primary 20 MHz band, additional signaling for channel indication is not required but bandwidth efficiency is poor. Thus, in order to increase bandwidth efficiency, it may be indicated through the indicator in the first control field indicate whether a center frequency used by the reception device is primary 20 MHz or secondary 20 MHz.

Here, the indicator may be set to one bit. Thus, signaling overhead may be reduced as compared with the case where a frequency band used by the reception device is indicated one by one.

When the indicator indicates the first frequency band, the frequency band used by the reception device may be determined to be the first frequency band or the third frequency band according to the second control field. In addition, when the indicator indicates the second frequency band, the frequency band used by the reception device may be determined to be the second frequency band or the fourth frequency band according to the second control field.

This is because the second control field and the frequency band have the following mapping relationship.

The second control field includes a first signal field corresponding to the first frequency band and a second signal field corresponding to the second frequency band.

The first signal field includes identification information on at least one reception device allocated to the first data field and the third data field, and further includes allocation information on at least one RU for the first data field and the third data field.

The second signal field includes identification information on at least one reception device allocated to the second data field and the fourth data field, and further includes allocation information on at least one RU for the second data field and the fourth data field.

The second control field includes a third signal field which is a duplicate of the first signal field, and the third signal field corresponds to the third frequency band.

The second control field includes a fourth signal field which is a duplicate of the second signal field, and the fourth signal field corresponds to the fourth frequency band.

Accordingly, the reception device having only the capability for the 20 MHz band may use primary 20 MHz or a frequency band (or channel) corresponding to primary 20 MHz or may use secondary 20 MHz or a frequency band (or channel) corresponding to secondary 20 MHz through the first control field and the second control field.

The identification information on the at least one reception device may include an association identifier (AID) of an STA.

In addition, the first signal field may include a user-common field and a user-specific field. The user-common field may include allocation information on at least one RU for the first data field and the third data field. The user-specific field may include identification information on at least one STA allocated to the first data field and the third data field.

Also, the second signal field may include a user-common field and a user-specific field. The user-common field may include allocation information on at least one RU for the second data field and the fourth data field. The user-specific field may include identification information on at least one STA allocated to the second data field and the fourth data field.

Figure 23:
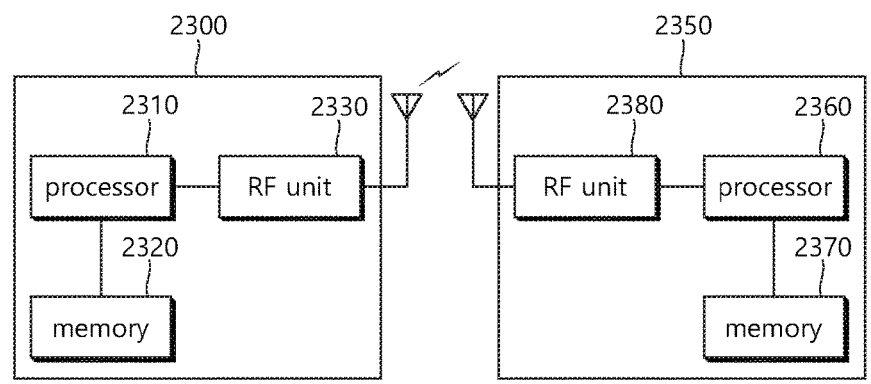
FIG. 23 is a block diagram showing a wireless device to which the exemplary embodiment of the present invention may be applied.

FIG. 23 is a block diagram showing a wireless device to which an exemplary embodiment of the present invention may be applied.

Referring to FIG. 23, the wireless device, that is, a station (STA) capable of implementing the aforementioned exemplary embodiment, may correspond to an AP STA or a non-AP STA. The wireless device may correspond to the aforementioned user or may correspond to a transmission device that sends a signal to the user.

The AP 2300 includes a processor 2310, memory 2320, and a radio frequency (RF) unit 2330.

The RF unit 2330 is connected to the processor 2310 and may send and/or receive a radio signal.

The processor 2310 implements the functions, processes and/or methods proposed in this specification. For example, the processor 2310 may be implemented to perform the operations according to the aforementioned exemplary embodiments of the present invention. More specifically, the processor 2310 may perform the operations capable of being by the AP from among the operations disclosed in the exemplary embodiments of FIGS. 1 to 22.

The non-AP STA 2350 includes a processor 2360, memory 2370, and an RF unit 2380.

The RF unit 2380 is connected to the processor 2360, and may send and/or receive a signal.

The processor 2360 may implement the functions, processes and/or methods proposed in the exemplary embodiment of the present invention. For example, the processor 2360 may be implemented to perform the non-AP STA operations according to the aforementioned exemplary embodiments of the present invention. The processor may perform the operations of the non-AP STA, which are disclosed in the exemplary embodiments of FIGS. 1 to 22.

The processor 2310 and 2360 may include an application-specific integrated circuit (ASIC), other chip sets, a logical circuit, a data processing device and/or a converter which converts a baseband signal into a radio signal and vice versa. The memory 2320 and 2370 may include read-only memory (ROM), random access memory (RAM), flash memory, a memory card, a storage medium and/or other storage devices. The RF unit 2330 and 2380 may include one or more antennas which sends and/or receives a radio signal.

When the exemplary embodiment is implemented in the form of software, the aforementioned method may be implemented in the form of a module (or process, function, and so on) that performs the aforementioned functions. The module may be stored in the memory 2320 and 2370 and may be executed by the processor 2310 and 2360. The memory 2320 and 2370 may be located inside or outside the processor 2310 and 2360 and may be connected to the processor 2310 and 2360 through a diversity of well-known means.

What is claimed is:

1. A method in a wireless local area network (WLAN) system using at least one radio unit (RU) corresponding to a preset frequency band, the method comprising:
configuring, by a transmission device, a physical protocol data unit (PPDU) comprising first to fourth data fields corresponding to first to fourth frequency bands, respectively; and
transmitting, by the transmission device, the PPDU to a reception device which has only a capability for a 20 MHz band,
wherein the PPDU further comprises a first control field and a second control field,
wherein the first control field comprises an indicator indicating the first frequency band or the second frequency band,
wherein the second control field comprises a first signal field corresponding to the first frequency band, a second signal field corresponding to the second frequency band, a third signal field corresponding to the third frequency band and a fourth signal field corresponding to the fourth frequency band,
wherein the third signal field is a duplicate of the first signal field, and the fourth signal field is a duplicate of the second signal field,
wherein when the indicator indicates the first frequency band, a frequency band to be used by the reception device among the first to fourth frequency bands is determined to be the first frequency band or the third frequency band based on the second control field,
wherein when the indicator indicates the second frequency band, a frequency band to be used by the reception device among the first to fourth frequency bands is determined to be the second frequency band or the fourth frequency band based on the second control field,
wherein a data field corresponding to the determined frequency band among the first to fourth data fields is received by the reception device through the determined frequency band.

2. The method of claim 1, wherein the indicator is set to one bit.

3. The method of claim 1, wherein the first signal field comprises a user-common field and a user-specific field, the user-common field comprises allocation information on at least one RU for the first data field and the third data field, and the user-specific field comprises identification information on at least one STA allocated to the first data field and the third data field.

4. The method of claim 1, wherein the second signal field comprises a user-common field and a user-specific field, the user-common field comprises allocation information on at least one RU for the second data field and the fourth data field, and the user-specific field comprises identification information on at least one reception device allocated to the second data field and the fourth data field.

5. The method of claim 1, wherein the PPDU is transmitted through an 80 MHz band, and the first to fourth frequency bands each correspond to a 20 MHz band.

6. The method of claim 1, wherein the first control field corresponds to an HE-SIG-A field, and the second control field corresponds to an HE-SIG-B field.

7. A transmission device in a wireless local area network (WLAN) system, the transmission device comprising:
a radio frequency (RF) unit that transmits or receives a radio signal; and
a processor to control the RF unit,
wherein the processor configures a physical protocol data unit (PPDU) comprising first to fourth data fields corresponding to first to fourth frequency bands, respectively, and transmits the PPDU to a reception device which has only a capability for a 20 MHz band,
wherein the PPDU further comprises a first control field and a second control field,
wherein the first control field comprises an indicator indicating the first frequency band or the second frequency band,
wherein the second control field comprises a first signal field corresponding to the first frequency band, a second signal field corresponding to the second frequency band, a third signal field corresponding to the third frequency band and a fourth signal field corresponding to the fourth frequency band,
wherein the third signal field is a duplicate of the first signal field, and the fourth signal field is a duplicate of the second signal field,
wherein when the indicator indicates the first frequency band, a frequency band to be used by the reception device among the first to fourth frequency bands is determined to be the first frequency band or the third frequency band based on the second control field,
wherein when the indicator indicates the second frequency band, a frequency band to be used by the reception device among the first to fourth frequency bands is determined to be the second frequency band or the fourth frequency band based on the second control field,
wherein a data field corresponding to the determined frequency band among the first to fourth data fields is received by the reception device through the determined frequency band.

8. The transmission device of claim 7, wherein the indicator is set to one bit.

9. The transmission device of claim 7, wherein the PPDU is transmitted through an 80 MHz band, and the first to fourth frequency bands each correspond to a 20 MHz band.

* * * * *